United States Patent
Turock et al.

(10) Patent No.: US 12,462,909 B2
(45) Date of Patent: Nov. 4, 2025

(54) ARTIFICIAL INTELLIGENCE MACHINE LEARNING METHOD AND SYSTEM FOR IDENTIFYING AND REDACTING PERSONALLY IDENTIFIABLE INFORMATION IN A MONITORED ENVIRONMENT USING REAL-TIME SENSOR DATA

(71) Applicant: Therap Services, LLC, Torrington, CT (US)

(72) Inventors: David Lawrence Turock, Fort Lauderdale, FL (US); Justin Mark Brockie, Wolcott, CT (US); James Michael Kelly, Morris, CT (US); Richard Allen Robbins, Lenox, MA (US); Md Rayed Bin Wahed, Dacca (BD); Rafid Ameer Mahmud, Dacca (BD); Meheraj Hossain, Dacca (BD); Pranjal Kumar Nandi, Dacca (BD); Heather Anne Turock, Fort Lauderdale, FL (US); Md. Asif Ali, Rocky Hill, CT (US); Jeremy Ian Schulman Robbins, New York, NY (US)

(73) Assignee: Therap Services, LLC, Torrington, CT (US)

( * ) Notice: Subject to any disclaimer, the term of this patent is extended or adjusted under 35 U.S.C. 154(b) by 104 days.

(21) Appl. No.: 18/430,784

(22) Filed: Feb. 2, 2024

(65) Prior Publication Data
US 2024/0212804 A1 Jun. 27, 2024

Related U.S. Application Data

(60) Continuation-in-part of application No. 17/941,163, filed on Sep. 9, 2022, now Pat. No. 11,923,053, which
(Continued)

(51) Int. Cl.
*G16H 10/60* (2018.01)
*H04L 9/40* (2022.01)

(52) U.S. Cl.
CPC ............. *G16H 10/60* (2018.01); *H04L 63/10* (2013.01)

(58) Field of Classification Search
CPC ................................ G16H 10/60; H04L 63/10
(Continued)

(56) References Cited

U.S. PATENT DOCUMENTS 6,132,724 A * 10/2000 Blum ..................... A61K 33/24
514/561
6,338,039 B1 * 1/2002 Lonski ..................... G16H 15/00
705/2
(Continued)

OTHER PUBLICATIONS

S. Brown, Machine Learning, Explained (Apr. 21, 2021); https://mitsloan.mit.edu/ideas-made-to-matter/machine-learning-explained (accessed Jan. 12, 2024).
(Continued)

*Primary Examiner* — Michael Tomaszewski
(74) *Attorney, Agent, or Firm* — Klaiber IP Law LLC; James R. Klaiber

(57) ABSTRACT

The present invention relates to computer security methods and systems, employing artificial intelligence and machine learning, for recording information in an electronic format relating to the individual under care, from a sensor, identifying the individual under care from the information, and redacting information associated with the individual under care before transmitting to the user.

26 Claims, 44 Drawing Sheets

Related U.S. Application Data is a continuation of application No. 16/695,591, filed on Nov. 26, 2019, now Pat. No. 11,475,983, which is a division of application No. 13/675,440, filed on Nov. 13, 2012, now abandoned, which is a continuation-in-part of application No. 13/600,402, filed on Aug. 31, 2012, now Pat. No. 8,613,054, and a continuation-in-part of application No. 13/600,388, filed on Aug. 31, 2012, now Pat. No. 8,615,790, said application No. 13/600,402 is a division of application No. 11/604,577, filed on Nov. 27, 2006, now Pat. No. 8,281,370.

(60) Provisional application No. 63/443,349, filed on Feb. 3, 2023.

(58) Field of Classification Search
USPC .......................................................... 705/2–3
See application file for complete search history.

(56) References Cited

U.S. PATENT DOCUMENTS

| | | | | |
|---|---|---|---|---|
| 6,463,417 | B1* | 10/2002 | Schoenberg | G06Q 10/10 705/2 |
| 7,139,914 | B2* | 11/2006 | Arnouse | G06Q 20/40145 713/172 |
| 7,689,437 | B1* | 3/2010 | Teller | A61B 5/411 600/300 |
| 8,191,152 | B1* | 5/2012 | Barker | G06Q 40/00 704/244 |
| 8,521,564 | B1* | 8/2013 | Ciechanowski | G16H 15/00 345/650 |
| 11,475,983 | B2* | 10/2022 | Robbins | H04L 63/10 |
| 2003/0108240 | A1* | 6/2003 | Gutta | G06T 5/70 382/282 |
| 2003/0217290 | A1* | 11/2003 | Dick | G16H 15/00 713/153 |
| 2004/0202382 | A1* | 10/2004 | Pilu | H04N 23/661 386/E5.072 |
| 2006/0155668 | A1* | 7/2006 | Miller | G06F 21/6245 |
| 2007/0061164 | A1* | 3/2007 | Broselow | G16H 10/60 705/2 |
| 2007/0286520 | A1* | 12/2007 | Zhang | H04N 7/147 382/173 |
| 2011/0218814 | A1* | 9/2011 | Coats | G16H 10/60 705/2 |
| 2011/0257994 | A1* | 10/2011 | Givens | G16H 40/67 705/2 |
| 2011/0289443 | A1* | 11/2011 | Heaven | G16H 20/70 705/7.42 |
| 2012/0011565 | A1* | 1/2012 | Garlie | G06F 21/6245 726/2 |
| 2013/0238347 | A1* | 9/2013 | Denton | G16H 10/60 705/2 |
| 2014/0085400 | A1* | 3/2014 | Kaus | G06Q 10/02 348/14.03 |
| 2016/0246989 | A1* | 8/2016 | Roy | H04L 63/102 |
| 2017/0372096 | A1* | 12/2017 | Yousfi | G06F 21/6254 |
| 2020/0285771 | A1* | 9/2020 | Dey | G06F 21/6272 |
| 2020/0372180 | A1* | 11/2020 | Venkataraman | H04L 63/0407 |
| 2023/0005579 | A1* | 1/2023 | Robbins | H04L 63/10 |
| 2023/0076102 | A1* | 3/2023 | Robbins | G16H 20/00 |

OTHER PUBLICATIONS

C.-Y. Wang et al., YOLOv7: Trainable bag-of-freebies sets new state-of-the-art for real-time object detectors. (Jul. 6, 2022); available at arxiv.org/abs/2207.02696.

J. Deng et al., RetinaFace: Single-stage Dense Face Localisation in the Wild (May 4, 2019); available at arxiv.org/abs/1905.00641.

F. Schroff et al., FaceNet: A Unified Embedding for Face Recognition and Clustering. 2015 IEEE Conference on Computer Vision and Pattern Recognition (Jun. 17, 2015).

O. Ronneberger et al., T. (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science, vol. 9351 (May 18, 2015).

H. Duan et al., Revisiting Skeleton-based Action Recognition (Apr. 2, 2022); available at arxiv.org/abs/2104.13586.

* cited by examiner

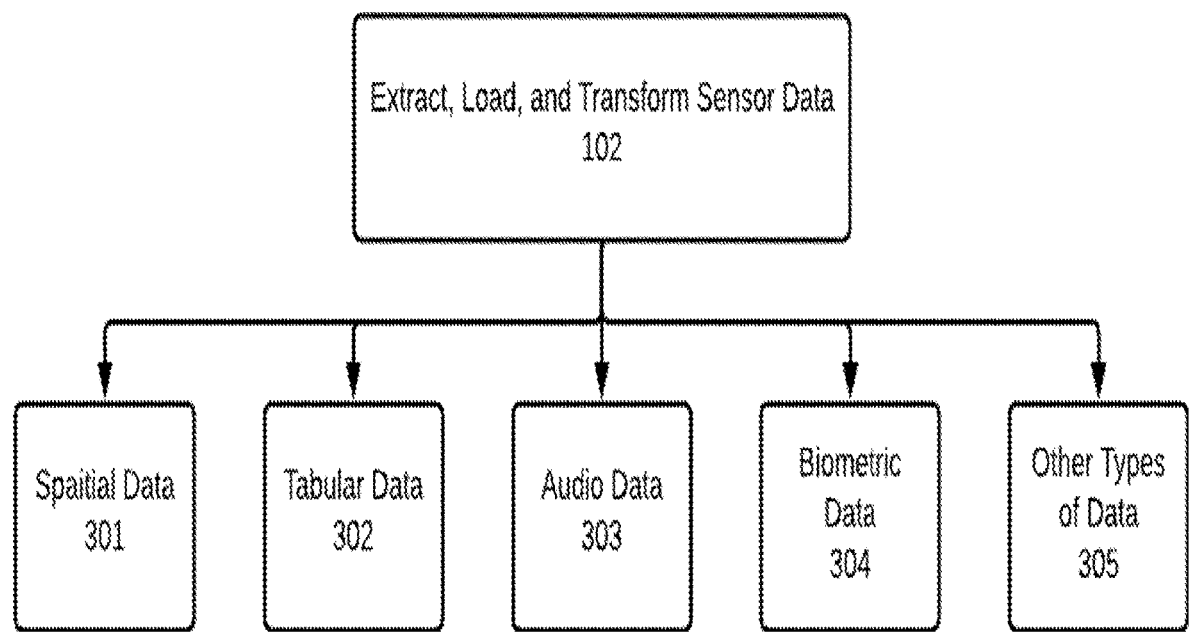

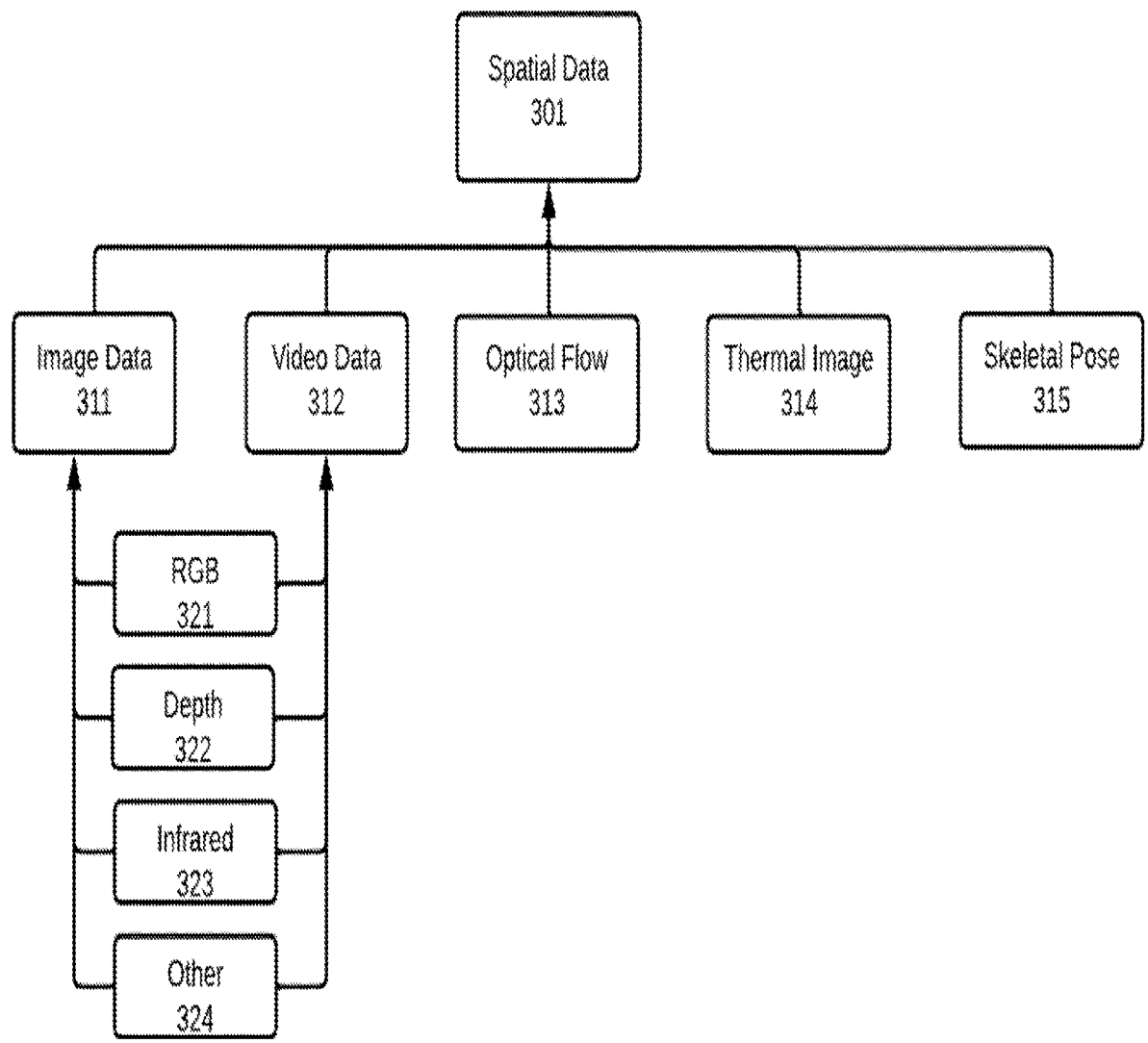

ARTIFICIAL INTELLIGENCE MACHINE LEARNING METHOD AND SYSTEM FOR IDENTIFYING AND REDACTING PERSONALLY IDENTIFIABLE INFORMATION IN A MONITORED ENVIRONMENT USING REAL-TIME SENSOR DATA

CROSS-REFERENCE TO RELATED APPLICATIONS

The present invention claims priority to U.S. Provisional Patent Application No. 63/443,349, filed Feb. 3, 2023, the disclosures and teachings of which are incorporated herein by reference in their entirety. The present invention also claims priority to and is a Continuation-In-Part of allowed U.S. patent application Ser. No. 17/941,163, filed Sep. 9, 2022, which is a Divisional application of U.S. patent application Ser. No. 16/695,591, filed Nov. 25, 2019, which issued Oct. 18, 2022 as U.S. Pat. No. 11,475,983, which is a Divisional application of U.S. patent application Ser. No. 13/675,440 filed Nov. 13, 2012, which is a Continuation-In-Part application of U.S. patent application Ser. No. 13/600,388 (which issued Dec. 24, 2013 as U.S. Pat. No. 8,615,790) and Ser. No. 13/600,402 (which issued Dec. 17, 2013 as U.S. Pat. No. 8,613,054), both filed on Aug. 31, 2012, and both of which are Divisional Applications of U.S. application Ser. No. 11/604,577, filed Nov. 27, 2006, which issued as U.S. Pat. No. 8,281,370 on Oct. 2, 2012, the disclosures and teachings of each of which are incorporated herein by reference in their entirety.

BACKGROUND OF THE DISCLOSURE

Human service agencies use some mixture of paper-based and electronic documentation systems in recording information about the persons being cared for, classified as individuals, and those providing the care, classified as caregivers. This care data is typically fed into the system through a selection of predefined options or open-ended text-fields to be filled manually. It is then stored in a database (filing cabinet/software) and later retrieved to make decisions about the individual's well-being, quality and proof of service, prevention of abuse and neglect, along with other parameters. This method, while common, is inadequate due to issues with the accuracy and usefulness of the recorded data. First, there could be human errors during data entry. Second, caregivers, consultants, family members and others may inaccurately interpret or falsely document the individuals' statements as well as actions and other non-verbal forms of communication. Third, individuals may not be able to communicate their wishes palpably or simply choose not to share certain types of information thinking such personal wishes are irrelevant, whereas they could potentially be useful to the agency in providing better care. This makes providing true person-centric, individualized care challenging and error-prone to implement.

A system that can accurately capture ground truth data in part or in its entirety, use that data to make reliable data-driven predictions, and protect the individual's privacy whilst providing additional contextual information, can make personal care delivery vastly more effective, informative, and set new standards. Suppose a caregiver makes an inquiry to an individual, "how are you feeling today?" The response might be a typical "I feel all right!," and the caregiver might be satisfied with it. However, it could so happen that the night before, the individual did not get enough sleep and the individual's sleep cycle was interrupted by above-average awake events. If the caregiver has access to information on the individual's sleep patterns the night before, the caregiver can use it to enhance his/her understanding of the individual's current mental and physical state and make better decisions about the nature of care to administer to this individual. However, if the individual does not provide that information, the caregiver has no way to know. Having access to more detailed information can inform the caregiver about what the individual's response means in the context of that particular individual, at that moment in time.

Even if a more reliable, automatic, real-time means of data capture can be made possible, which is an aspect of the systems disclosed as embodiments of this invention, the second obstacle becomes protecting that information and making it accessible only to those that have proper access to such information. Since the individual's data is usually Protected Health Information ("PHI"), extra care has to be taken into consideration when displaying or sharing that data. This necessitates more intelligent ways of applying information redaction so that personal information can be gathered efficiently and accurately, yet protected.

The third challenge has to do with the nature of streaming, real-time data such as videos. Since streaming data is uncensored at the time of capture, how does one ensure that the individual's privacy is protected even if the person viewing has access to view that data? Suppose a caregiver remotely accesses the camera feed in an individual's room. Should the caregiver be allowed to see the individual nude? If an organization administrator views that data later on for quality of service purposes, should the administrator be allowed to see deeply private information such as the individual using the bathroom?

It is the aim of the systems disclosed as embodiments of this invention to tackle each of these challenges in part, as well as to provide artificially intelligent machine learning systems and methods that can be applied to even non-HIPAA-compliant situations, and in any environment where some form of monitoring is desired. "Machine learning is a subfield of artificial intelligence, which is broadly defined as the capability of a machine to imitate intelligent human behavior." https://mitsloan.mit.edu/ideas-made-to-matter/machine-learning-explained (accessed Jan. 12, 2024). This application is directed to solutions to challenges specifically arising in the realm of computer networks and to specific improvements in computer network functionality that address these challenges. The systems disclosed as embodiments of this invention improve the acquisition and transmission of information, including but not limited to PHI, across multiple networks and security domains. Systems and devices that perform the functions at least of automatically capturing various sensor data, making data driven predictions based on that and historical data, and redacting PHI for providing care, proof of service, and prevention of abuse and neglect based on that information, were neither routine, well-understood, nor conventional in the field of health information technology, as that term is defined in the HITECH (Health Information Technology for Economic and Clinical Health) Act.

BRIEF SUMMARY OF THE DISCLOSURE

The present invention relates to methods and systems for automatically capturing various sensor data, making data driven predictions based on that and historical data, and redacting personally identifiable information for providing care, proof of service, and prevention of abuse and neglect based on that information.

BRIEF DESCRIPTION OF THE FIGURES

FIG. 3A illustrates an overview of various data types that are handled by the system.

FIG. 3B shows examples of spatial data.

DETAILED DESCRIPTION OF THE DISCLOSURE

Description will now be given of the currently preferred embodiments of the invention with reference to the attached FIGS. 1-28. It should be understood that these figures are exemplary in nature and in no way serve to limit the scope of the invention as the invention will be defined by claims, and the scope of the invention will be the scope of the claims, as interpreted by the courts.

The described embodiments of the present invention present a novel technology to automatically redact various elements of recorded or live visual images according to a set of rules. Elements of the images are identified by a combination of sensor inputs and machine vision analysis and classified into groups. These elements may include, for example, objects in the room such as furniture, the floor, ceiling, or walls of a room, or animate objects such as individuals or animals present in the images.

Based on a pre-specified set of rules, groups may be selectively redacted in multiple ways, for example by replacing the portion of the image space containing the elements in that group with a blanked out pattern or, in the case of an individual, a stick figure representation conveying body position. Other elements such as a lamp could also be replaced by a characterization of that object rather than its actual image.

Complex intersections of rules may be used to determine which groups in the images should be passed through without redaction and which should be redacted, and what the form that redaction should take. As an example, if two individuals in a series of images were classified into a group called caregivers, and one individual in that same series of images was classified into a group called patient, the image space associated with the patient could be fully redacted while the image space associated with the caregivers would remain unredacted.

Figure 1:
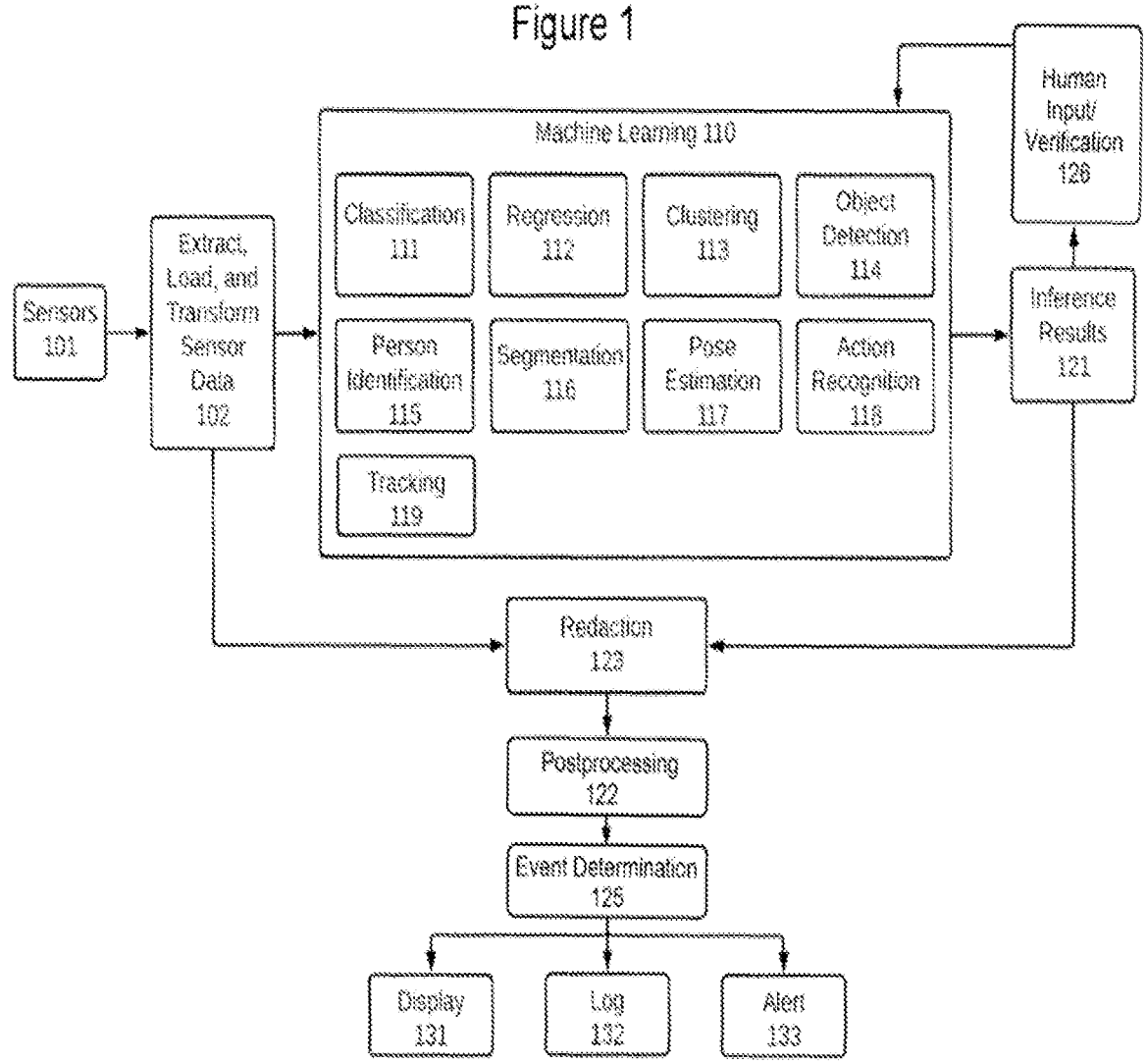
FIG. 1 illustrates an overview of the components and their interaction in the overall system proposed.

FIG. 1 shows an overview of the components and their interactions in the system proposed. This system consists of multiple layers such as data capture, processing, and extracting new information to achieve privacy preserving, real-time, adaptive and effective monitoring capabilities. The first component of the system is hardware Sensors 101 of different modalities such as cameras, smartwatches, microphones, etc. that can be used to sense the environment with great precision and detail. In addition to detecting animate and inanimate objects in the environment, they can be further used to sense properties of the environment such as temperature, pressure, and other variables. Data from Sensors 101 includes both data collected in real time as well as previously recorded sensor data that has been stored in computer memory. The raw sensor data about the environment is then transmitted to Extract, Load, and Transform Sensor Data 102. At this stage, the system decrypts, extracts, loads data into computer memory, and transforms the sensor data fit for consumption by various machine learning models. The data preprocessing can happen on-site or in the cloud. While using different modalities of data, the system scales and transforms them so the combined information represents the environment consistently. The information is then passed to Machine Learning 110 to find higher level information about the elements of the environment.

Pretrained machine learning models can be used to make predictions about the environment of events/actions that might be useful for the application. For example, Classification 111 is a technique used to assign arbitrary labels to input data. For instance, labeled images of cats and dogs can be used to build a classification model which will accurately predict a new image of a cat or a dog that the system has not seen before. Regression 112 can be used to predict numeric values such as the number of incontinence events that can be expected from an entity labeled patient based on historical data and 101. Clustering 113 can be used to cluster/group together entities based on their characteristics or features. This can help the system identify triggers and how they impact different groups to generate broad decisions about the environment. In schools for instance, students can be grouped together into different learning methods based on their learning preferences. The same can be done for traffic, prison, care homes, and other group environments.

With Object Detection 114, the system can detect a range of objects in the environment, classify them and pinpoint their locations. With the help of 114, the system can create a map of different objects in the environment, determine if certain dangerous combinations of objects are present. For example, the existence of weapons and prisoners should not be in very close proximity in prisons. Besides detection, another machine vision analysis is Person Identification 115 which can pick out the people in the environment and recognize them. Using this, the system can extract information on a personal level, such as storing the positional mapping of a specific patient in a hospital. Segmentation 116 can make very detailed classifications of the entirety of elements and separate them from one another. The system can use this for various tasks such as identifying interaction among elements. For example, if a region identified as a person is enclosed by another region classified as bed, the system can determine that the person is on the bed. Another form of analysis is Pose Estimation 117 which can identify the limbs of the elements and their orientations. Using this, the system can visualize the limbs of individuals in the environment as dots and lines to create a clear picture about their posture without any visual representation. On the other hand, Action Recognition 118 takes multiple instances of the environment and predicts what actions the elements are conducting. Inferencing the actions of the elements allows the system to notice if there are any potential dangers, such as elderly patients falling down on the floor.

Tracking 119 considers the elements and their respective positions to track the individual's characteristics and movements. The system can associate other inference results to the elements by tracking them and create results tailored to the individual. For example, tracking a person and remembering his/her actions throughout the day can generate a report of the daily activities of that person. After the machine vision analysis stage, the newfound information is collected in the Inference Result 121 stage. In the inference result, sufficient information to know about an individual's present state will be stored. It will also carry all the necessary information to make any decision. Redaction 123 is the method where the privacy of an individual is maintained at any situation. It takes sensor data 102 and based on the condition and information from 121, it determines which individual should be redacted and which data should be redacted. It redacts any information by which the individual can be identified. The redaction can be applied by replacing person pixels in an image data with black pixels or blurring or distorting the pixels. For audio or text data, noise can be applied on speech or writings to make it non-identifiable. Finally, the filtered and privacy preserving information is ready for alerting authority or to record logs.

Then, necessary changes and combinations of the inference results are made in the Postprocess 122 stage. At this stage, different heuristic analysis is done by the system to determine if an event has occurred 125. According to the type of event, concerned people are notified through Alert 133, the event is logged 132 and appropriate visualization of the environment is prepared in Display 131. In addition, the system may include an update loop in which feedback can be incorporated on system performance. For example, to verify if the system has correctly recognized an event or a person, it may request and collect human input 126 on the performance of the models and update the models appropriately. As an example, the feedback may be "Yes, system, you got that right," or "No, that was another type of event." The list of people that need to be notified by Alert 133 can be determined based on involvement, authoritative hierarchy and responsibilities or Caseloads as described in U.S. Pat. No. 8,281,370. As shown by reference 911 in U.S. Pat. No. 8,281,370, data may be stored in the system's storage array. Access to information is based on caseload(s) and defined access roles (see U.S. Pat. No. 11,475,983 at FIG. 27, incorporated by reference). Documentation can include the information on caseloads, tracking, storage, and tagging as discussed in U.S. Pat. No. 8,281,370, including but not limited to the discussion Col. 5, line 21-col. 7, line 32. As discussed in U.S. Pat. No. 8,281,370, caseloads are the specific set of information that defines what individual or program a user can have access to. Super roles are referred to as the privilege that a user needs in order to access a particular application within the system. The documentation can include the information on caseloads and super roles, discussed in U.S. Pat. No. 8,281,370, including but not limited to the discussion Col. 4, line 64-col. 5, line 60, and Col. 12, line 62-Col. 15, line 3. There may be other types of protected health information that is not subject to HIPAA-type regulations.

While and after logging the events 132, the events can be classified and grouped by the system to be handled in different ways. The Display 131 of information by the system can follow a similar structure and appropriate redactions can be made based on who is using the display. Elements of the environment will be redacted from the display of viewers who are not supposed to see them. The system can make such precise decisions based on the acquisition and processing of machine vision analysis data.

Figure 2A:
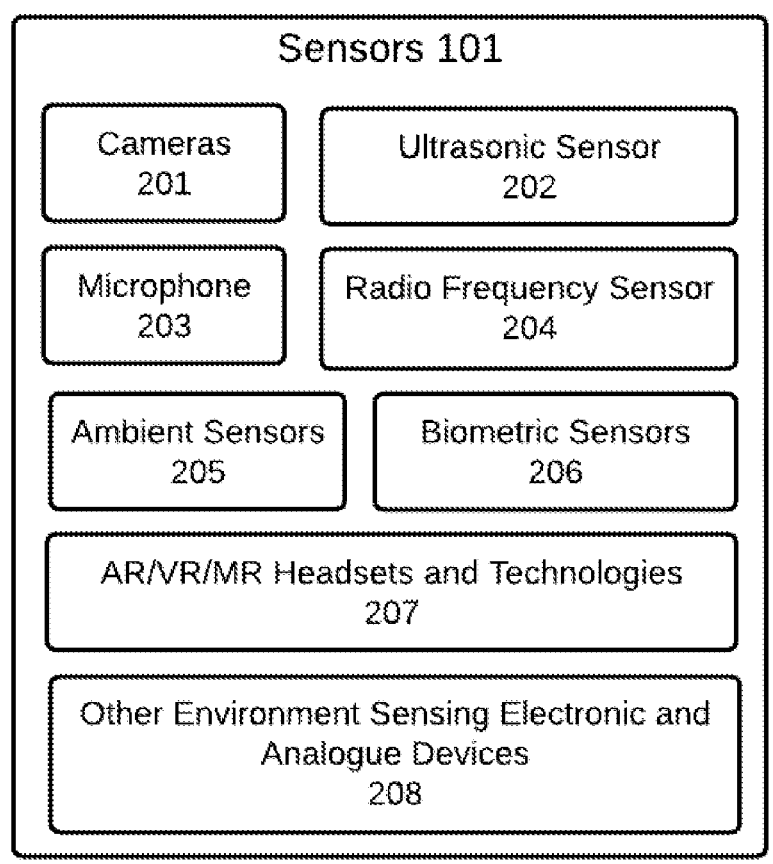
FIG. 2A shows a non-exhaustive list of the broad category of sensors.

Sensors. FIG. 2A shows a non-exhaustive list of the broad category of sensors that could be available in 101. A sensor is a device that senses physical inputs or stimulus from the environment and transforms those into human or machine interpretable data or decisions, hereinafter referred to as "sensor data". The system works with a variety of Sensors 101 including Cameras 201, Ultrasonic Sensor 202, Microphone 203, Radio Frequency Sensor 204, Ambient Sensors 205, Biometric Sensors 206, AR/VR/MR Headsets and Technologies 207 and Other Environment Sensing Electronic and Analogue Devices 208 and other devices.

Cameras 201 are used for capturing images and videos in different modalities such as RGB, Depth, IR etc. Ultrasonic Sensors 202 uses ultrasonic sound waves to measure the distance of objects in an environment. It emits high frequency sound waves and then calculates the time needed for the wave to come back. From the reflection time, it determines the distance of surrounding objects. Microphones 203 capture the sound vibrations in the air and transform them into electronic signals. Ambient Sensors 205 are used to measure different metrics and capture events in an environment such as pressure, temperature, humidity etc. It is heavily used to measure an environment's physical parameters. The system uses Biometric Sensors 206 to capture the biometric data of individuals such as heart rate, respiration rate, blood pressure, etc.

Figure 2B:
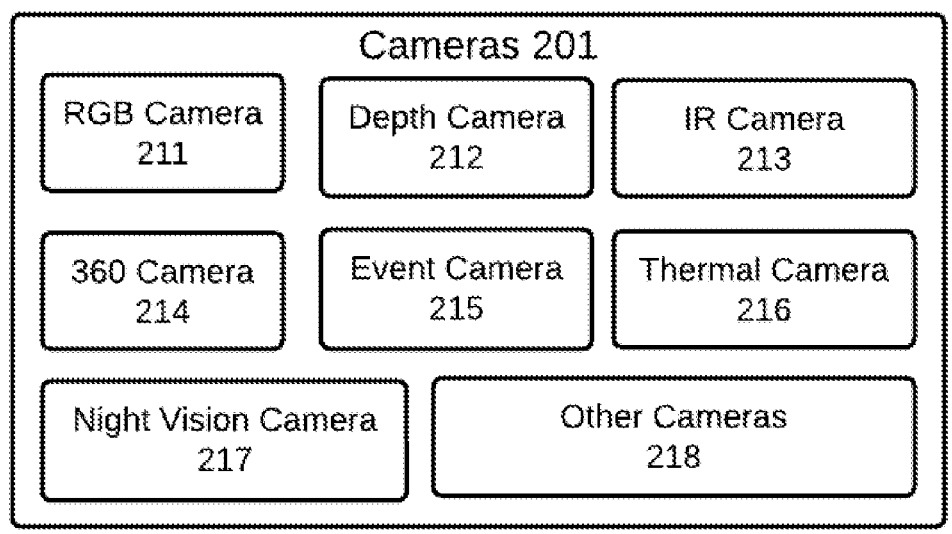
FIG. 2B shows the different types of cameras that the system can use to collect data in different modalities.

FIG. 2B shows the different types of cameras that the system can use to collect data in different modalities. RGB Camera 211 captures images or videos in RGB format which is the most common format for capturing them. There are a variety of cameras available based on its resolution. The higher the resolution, the clearer the picture, but higher resolution will take a lot of memory to store. Depth Camera 212 gives an estimation of distance from camera source to the object. IR camera 213 uses infra-red light waves to capture images. This is useful in the absence of light for instance at night. 360° Camera 214 is mainly RGB modality camera which captures everything around it, keeping the camera source as a center. Event camera 215 captures the change of brightness in pixel levels where each pixel works independently. Thermal Camera 216 captures infrared radiation and can convert it into images and videos. Night Vision Camera 217 can capture images and videos in total darkness. Besides those, there is a wider range of cameras 218 which works using different technology.

Figure 2C:
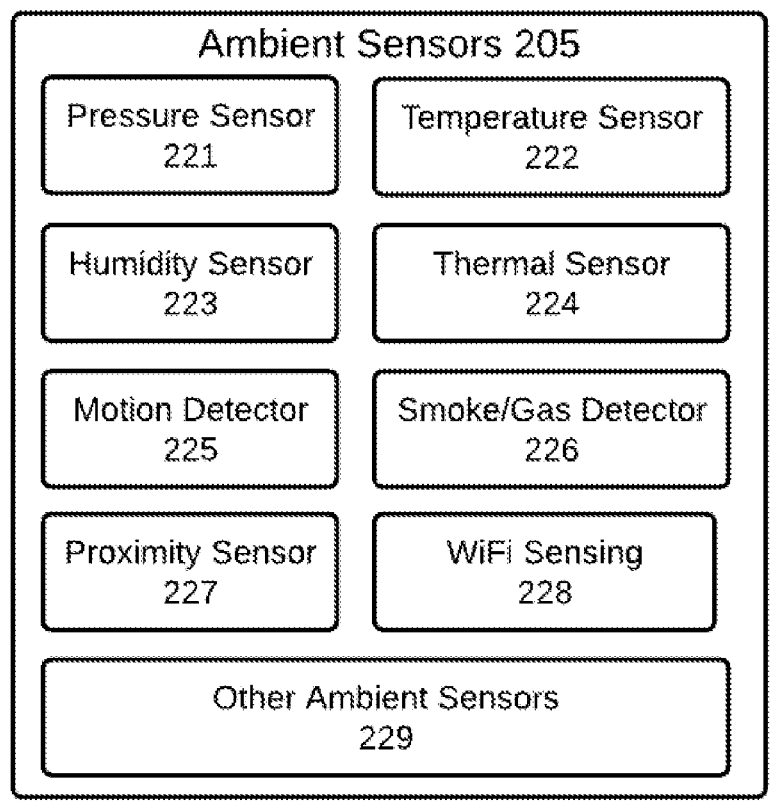
FIG. 2C presents a list of Ambient Sensors.

FIG. 2C presents a list of Ambient Sensors 205. Ambient sensors play a crucial role in daily activities. Ambient sensors can measure various physical parameters of the environment. These sensors can be attached to physical objects or the human body. Although there are some mobile ambient sensors, most of the sensors stay in a fixed position. Generally, the function of each of these sensors may be understood from its name. Pressure Sensor 221 is used to measure pressure created by any liquid or gas inside of a cylinder or closed container. Temperature sensor 222 senses the temperature of the environment or can be used to sense the temperature of an object or living body. Humidity Sensor 223 as the name suggests is used to determine the humidity of surroundings. Thermal Sensor 224 measures the change of temperature in the surroundings. Motion Detector 225 detects whether there is any motion within the sensor's field of view. Smoke/Gas Detector 226 indicates if there is any smoke/gas in the working zone of the sensor. Proximity Sensor 227 can sense whether there are any physical obstacles/objects nearby. WiFi Sensing 228 uses the existing wifi signal wave to estimate physical and biometric properties of objects and living bodies within range. Its use can be extended to object detection and even activity recognition. Also, there are other ambient sensors 229 which can give more information about the environment and humans.

Figure 2D:
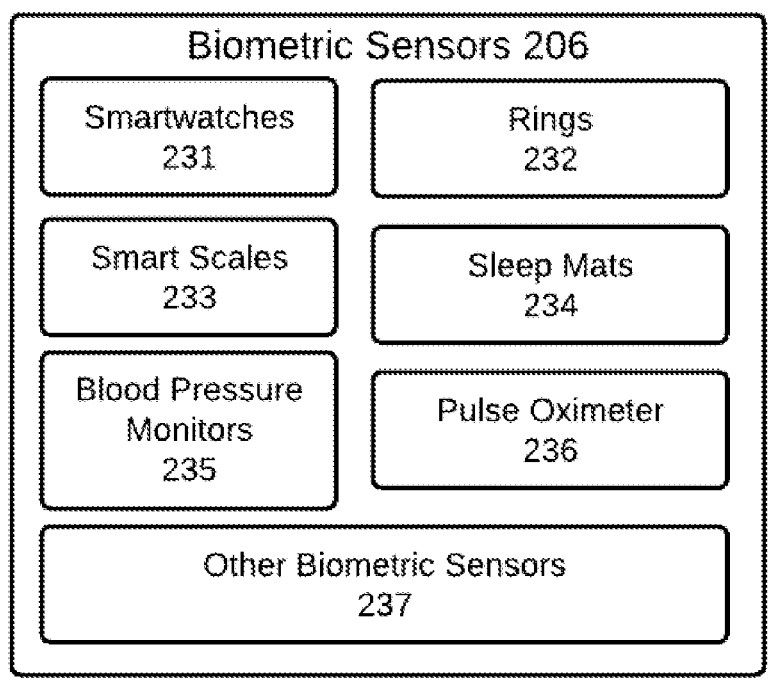
FIG. 2D shows the list of different biometric sensors.

FIG. 2D shows the list of different biometric sensors which are frequently used in health monitoring. Biometric Sensors 206 are essential to measure various human body measurements. A biometric sensor can be an external standalone sensor like thermometer, pulsimeter or sphygmomanometer or it can be integrated in a single device which can measure all of the values. This choice is made based on the case and physical state of the person. For example, Smartwatches 231 are a type of all-in-one device that can measure biological variables including blood pressure, oxygen level, and heart rate. Smart Scales 233 can measure variables such as body fat and body weight simultaneously. These smart devices can be connected to clouds where various body measurements can be stored in a periodic manner. Sleep mats 234 can help to determine the sleep cycle of a person. It can detect the different stages of sleep a person can be in and the duration of these stages. It also can be used to estimate the sleeping position and body angle of the person. Blood Pressure Monitors 235 and Pulse Oximeter 236 measure pressure and pulse as well as oxygen level. In this way, other 237 sensors and smart devices can be used to automate measurement and storing of various body parameters. Furthermore, the system may include the binding of biometric information to the individuals in the video/redacted information, and potentially in the event stream. As a first example, Individual X in video Y had heart rate of Z at the time that this information was stored/redacted. As a second example, Person W identified in Stream X (no video, just event stream) had a respiration rate of Y and a heart rate of Z at this moment in time.

Data Types Generated by Sensor. FIG. 3A illustrates an overview of various data types that are handled by the system. These data types are transformed and modified forms of raw data generated by various sensors. As the system operates with a wide range of Sensors 101, It needs to be adapted to different modalities of data including Spatial Data 301, Tabular Data 302, Audio Data 303, Biometric Data 304 and Others 305. Spatial data are generated mainly from Cameras 201. Microphones 203 generate Audio Data 303, Biometric Sensors 206 generate Biometric Data 304, and so on.

FIG. 3B shows examples of spatial data: Image Data 311, Video Data 312, Optical Flow 313, Thermal Image 314 and Skeletal Pose 315. Both Image Data 311 and Video Data 312 can be in different formats such as RGB 321, Depth 322, Infrared 323 etc.

Figure 4:
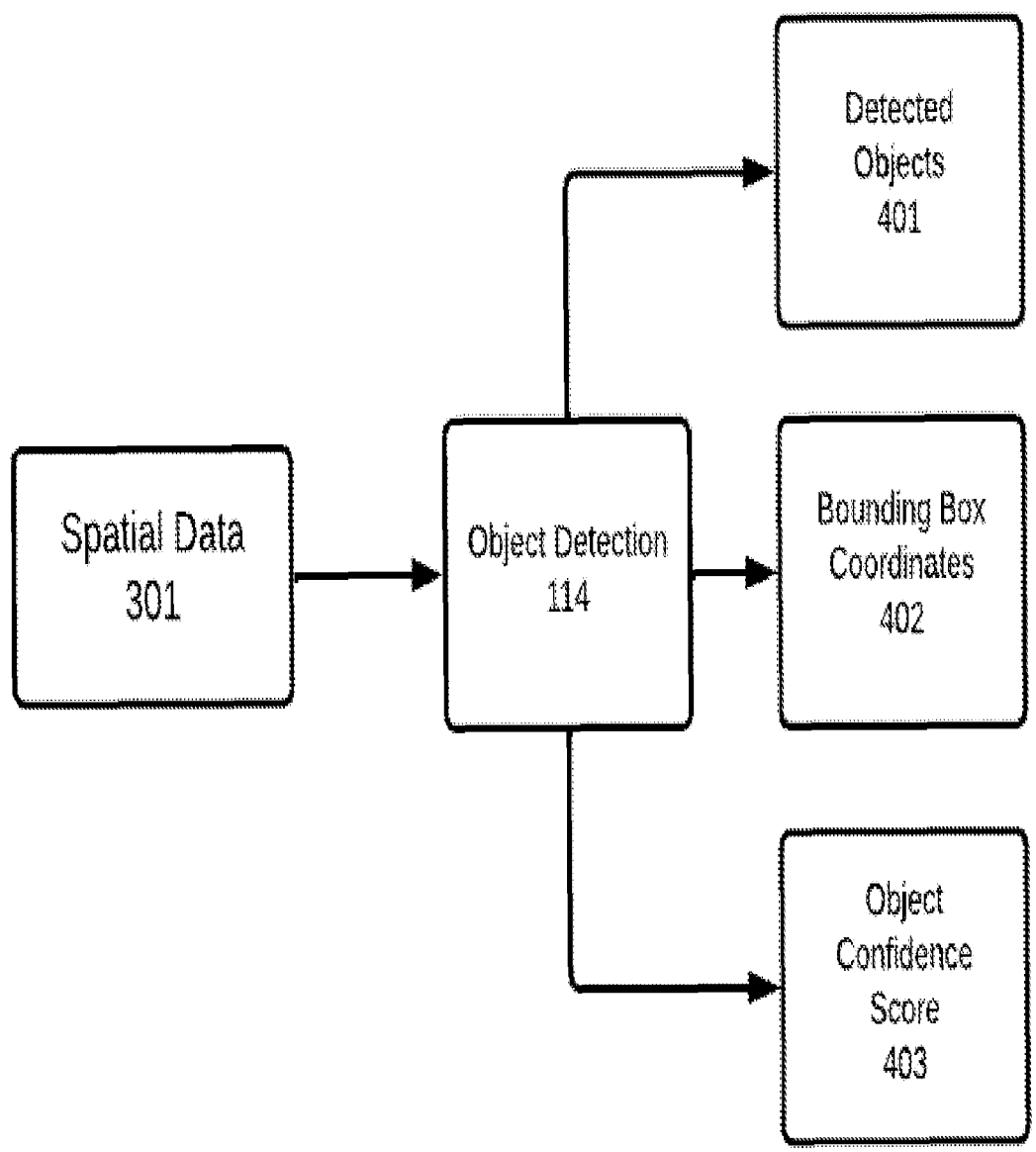
FIG. 4 illustrates the example of detecting objects in a scene.

Object Detection. FIG. 4 illustrates the Machine Learning 110 model Object Detection 114. This model takes information from the environment as Spatial Data 301 and generates new information in the form of classes of Detected Objects 401, Bounding Box Coordinates 402 and Object Confidence Score 403. This can be used in different tasks like Tracking 119, Person Identification 115, Person Movement Pattern 1401 and many more. The task is to detect objects in a space and identify them successfully.

For example, in a picture of a living room, Object Detection can determine if there are any people in the room and pinpoint their location. The same results can be generated for other objects. In the generated results, Detected Objects 401 represent the class or type of the object that was detected. In a monitoring task, this is a very useful tool as it can be used to identify anomalies, such as the presence of a person in an off-limits area, or finding non authorized car models on the road. It is also able to provide a count of specific objects, which can be applied in many other ways, such as counting cars for traffic, taking attendance in class, or manufacturing in factories.

Another result produced is the Bounding Box coordinates 402 which can indicate the position the object is occupying in the space represented by the spatial data. In camera feeds or images, the world is seen as a 2-Dimensional plane and the bounding box coordinates give the position of the object in that frame as two numbers on those axes. This result can be used in a more precise manner compared to Detected Objects 401. The presence of an object can be normal but its positioning can be cause for alarm. For example, prisoners are normal in a prison but only in their cell and not out of it. This result can also enable comparative analysis of interaction between objects. This task is to be able to detect if two objects are really close or interacting from their coordinates. The third result is the Object Confidence Score 403, which indicates how confident the machine learning model is about a prediction. The confidence score of object detection can vary depending on the visibility of objects, their forms and their color. This allows a more robust analysis of an environment where the confidence of the model can reflect the confidence of a decision made. If an anomaly occurs but the confidence scores of the objects are fairly low, it demands further evidence like consistent detection of the anomaly or occurrence of confident detections. The combination of these results provide a clear picture of the objects and their position in the environment. Object detection can employ various machine learning models, such as the YOLOv7 object detector (C.-Y. Wang et al., YOLOv7: Trainable bag-of-freebies sets new state-of-the-art for real-time object detectors. Available at arxiv.org/abs/2207.02696).

Figure 5:
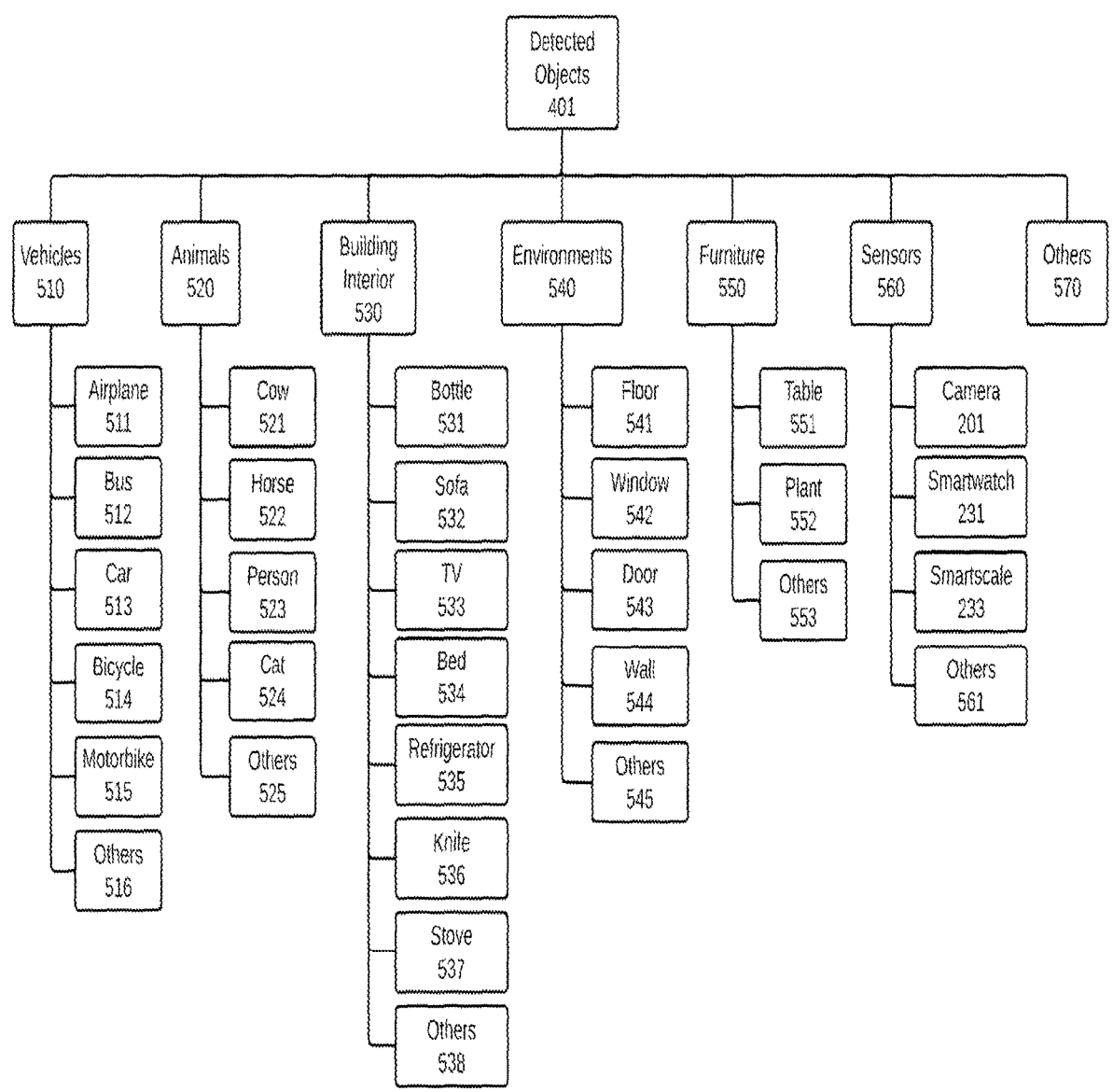
FIG. 5 provides examples of objects that can be detected by the object detection model.

Detected Objects. FIG. 5 demonstrates an exemplary list of Detected Objects 401 by the object detection model. This model can be used in a variety of environments, such as on the road to detect Vehicles 510, on the periphery to detect Animals 520, in a Household 530 scenario and Other 540 environments such as hospitals, prisons, factories, or schools. Detecting Vehicles 510 is a useful application of this model as it can distinguish between types of vehicles such as Airplane 511, Bus 512, Car 513, Bicycle 514, Motorbike 515. It can also detect other vehicles like jet skis, scooters etc. Another useful ability of this model is to detect animals and people in an environment. Other than Person 523, it can also detect domesticated animals like Cows 521, cattle, sheep and pets like Cats 524, dogs, birds, and so on. In a building interior 530 (such as a household) environment, the model can detect everyday items and furniture such as the Sofa 532, Bed 534, TV 533 etc. It can also detect kitchenware like Knives 536, Refrigerator 535, Stove 536 and Others 538. It can detect objects in the Environment 540, such as Floor 541, Window 542, Door 543, Wall 544, as well as Furniture 550 such as Table 551 and Plant 552. It can also detect Sensors 560 such as the Cameras 210, Smartwatch 231, and Smart Scale 232 discussed previously. The capabilities of an object detector model cover this variety of objects (as well as others) and pinpoint their locations.

Figure 6:
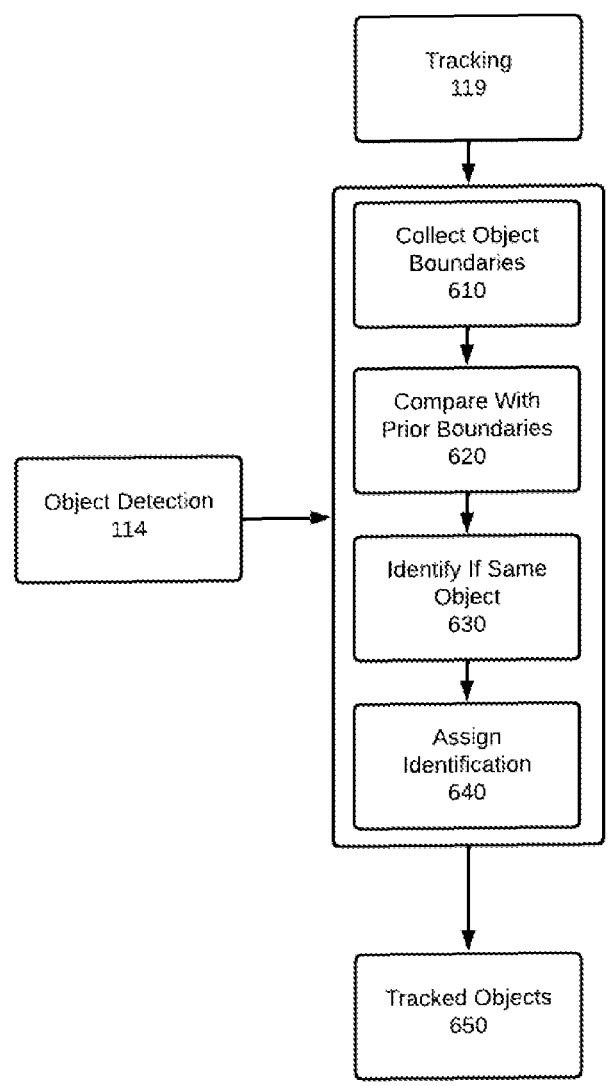
FIG. 6 Illustrates the working process of another Machine Learning tool Tracking.

Tracking. FIG. 6 illustrates the working process of another Machine Learning 110 tool, Tracking 119. This tool has uses for tasks such as Person Identification 115, Selective Redaction 1310, Action Recognition 118, Alert 133, and Logging Events 132. Tracking 119 takes the positions of objects at a specific moment in an environment as input, creates consistency and adds context. It collects the coordinates of the objects as boundaries 610 as their relative positions in the spatial data. Then it compares these objects with objects detected in previous timeframes 620. There are different ways of making this comparison and many effective algorithms have been proposed to increase the reliability. The relative positions of these objects can be compared through time and can be identified as the same objects 630. Other algorithms may compare their appearance and features alongside positions to solidify the decisions. Once the decisions are made, the algorithm assigns consistent IDs to the objects in the environment 640. Tracked IDs are obtained for all the objects in the environment as output. This tool can be used in many applications such as making individual identification consistent. When any form of recognition of objects is done, Tracking can carry that information through time, even when recognition is not viable anymore. Its capability extends to cases where recognition is needed only once. This allows monitoring individuals to be more reliable and robust. Other applications include following products in manufacturing in factories, making sure students are attending classes, and other circumstances where monitoring is desired. Another strong point of this tool is enabling logging activities of individuals as it can identify exact identities of individuals and associate actions with them, so those actions can be logged against the identity of that individual.

Figure 7:
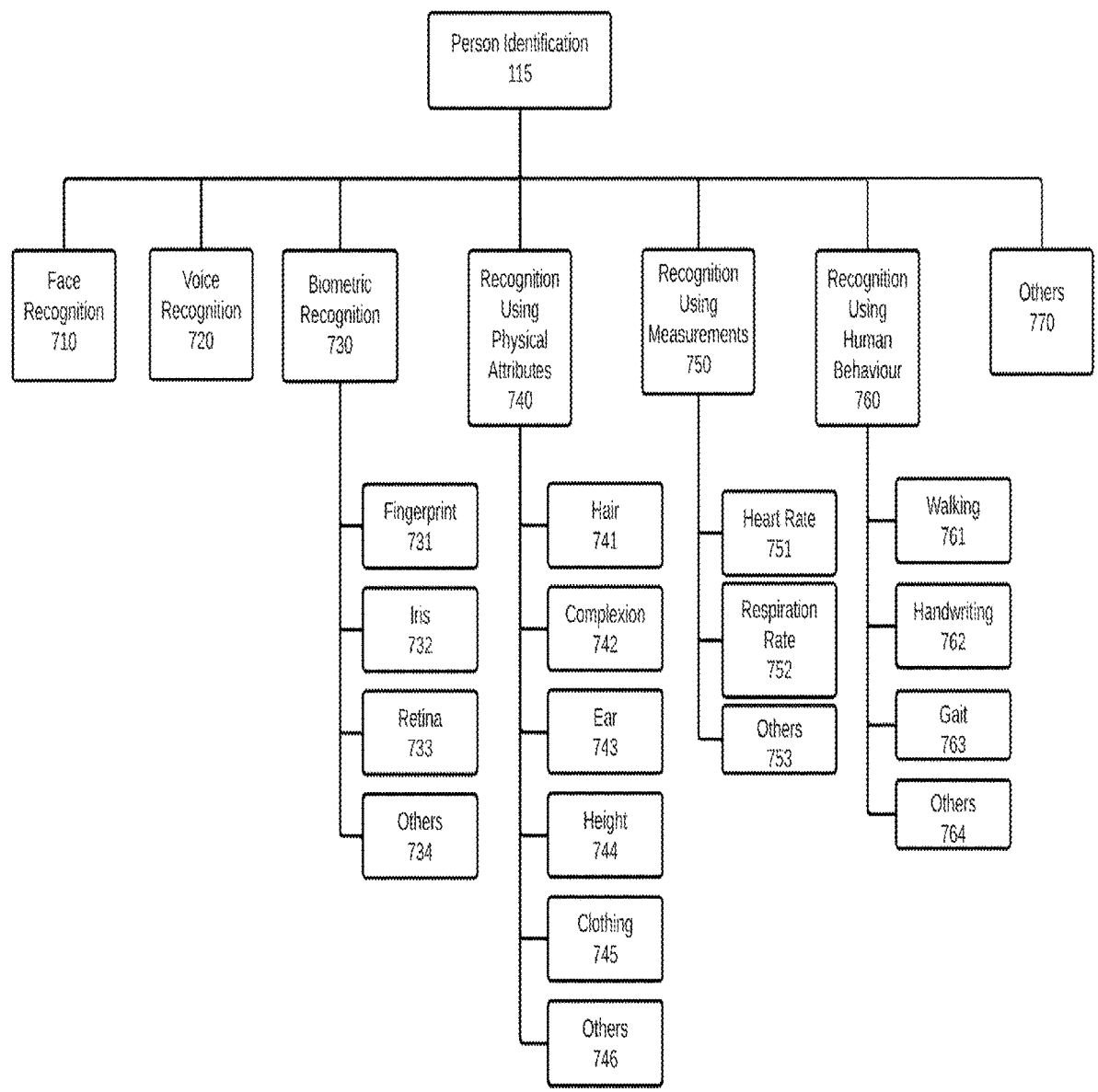
FIG. 7 shows different strategies in the system that can be used for person identification.

FIG. 7 shows different strategies in the system that can be used for the identification of individuals. The system has a wide range of tasks such as Action recognition 118 and Redact segmented regions of selected persons 1310 for which Person Identification 115 is used. For example, there are multiple persons in a scene and the system may only be interested in the actions of a particular person. It may be preferable for the system to monitor that particular person's action so that it can detect any anomalous activity going on in the scene involving that person. In this case, the system identifies the person of interest from the scene first, and then performs the Action Recognition 118 task to track the actions of the identified person. Also, the system may want to redact individuals from an image or video frame. If the system wants to redact only the persons that are chosen by the user then it needs to apply the Person identification 115 first to recognize the persons accurately.

There are several approaches that can accomplish the Person Identification 115 task. They are Face Recognition 710, Voice Recognition 720, Biometric Recognition 730, Recognition Using Physical Attributes 740, Recognition Using Measurements 750, Recognition using Human Behavior 760, and Others 770.

Face Recognition 710 is one of the most widely used techniques for identifying individuals from images or videos. Face recognition 710 verifies the identity of individuals by comparing their facial features against a database of faces. An overview of how face recognition works is depicted in FIG. 8. Voice Recognition 720 uses the voice of individuals to identify and authenticate them.

Biometric recognition 730 is the process of recognizing individuals based on their unique biological traits such as Fingerprint 731, Retina 733, Iris 732 and other biological patterns. Different physical attributes 740 including Hair 741, Complexion 742, Ear 743, Height 744, and Clothing 745 can be used to identify individuals. Individuals can also be recognized based on human behavioral traits 760 such as Handwriting style 762, Walking 761, and Gait 763. The recognition of events may be accomplished or improved by intersecting the visual information with biometric information. For example, if the visual information processing is unsure of the identity of a person, knowing an individual's nominal heart and respiration rate can add to the accuracy of the identification process by adding further differentiating information.

Figure 8A:
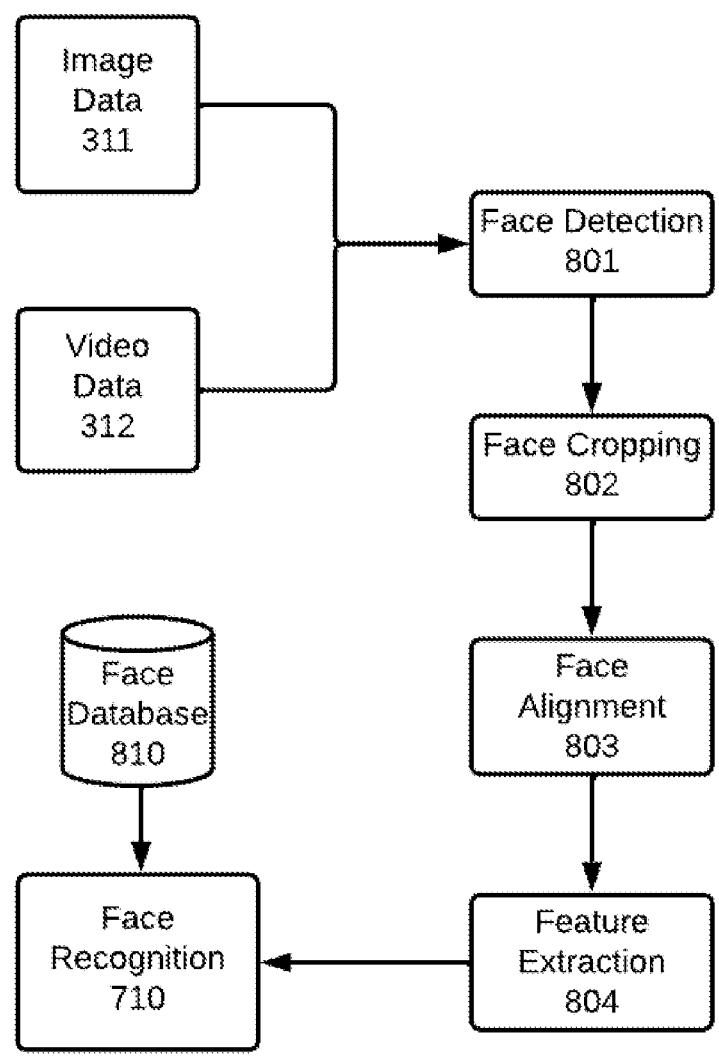
FIG. 8A illustrates the basic workflow of face recognition.

Facial Recognition Pipeline. FIG. 8A illustrates the basic workflow of Face recognition 710 pipeline. Face recognition 710 can identify a person from both Image Data 311 and Video Data 312. Data on which face recognition needs to be applied is passed through a detector for Face Detection 801 which detects the location of the face in the Image 311 or Video Frame 312. There are several available programs that can be used for face detection, such as RetinaFace (J. Deng et al., "RetinaFace: Single-stage Dense Face Localisation in the Wild" available at arxiv.org/abs/1905.00641). The system provides the bounding box coordinates of detected faces and multi-point facial landmarks, then uses the bounding box coordinates to Crop 802 the region containing faces from the input data. Then the system applies Alignment 803 on the cropped faces before passing to a feature extractor. The system uses the facial landmark points to align those faces. Face alignment ensures that the center of each face passing through the feature extractor will be the same. Aligned faces are then passed through a feature extractor model for Feature Extraction 804. Various facial recognition programs can be used, such as FaceNet (F. Schroff et al., FaceNet: A Unified Embedding for Face Recognition and Clustering. 2015 IEEE Conference on Computer Vision and Pattern Recognition. After performing the Feature Extraction 804, extracted features are matched against a Face database 810 which contains the facial features of the persons that may be recognized. If features of the person's face from the input data matches with an entity from the Face Database 810 with a similarity greater than a predefined threshold then that person is said to be recognized. Otherwise, the person is labeled as an unknown person.

Figure 8B:
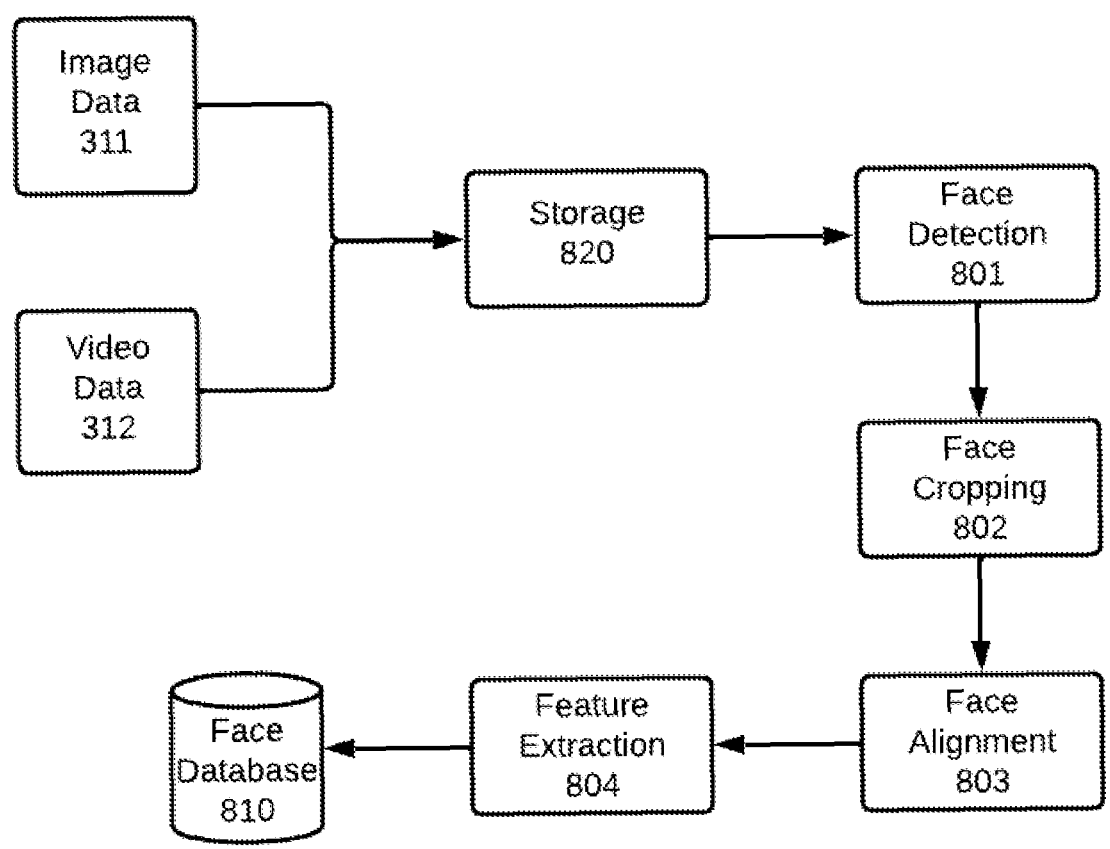
FIG. 8B illustrates the process of creating the Face Database.

Face Recognition Database. FIG. 8B illustrates the process of creating the Face Database 810 that is used while performing the Face Recognition 710. The images or videos of the individuals that may be recognized are located in a Storage System 820. To generate the database, those images or videos are passed through a Face Detector. Then Face cropping 802 and Face Alignment 803 is applied before passing to a Feature Extractor. Extracted features are stored in a database for further use.

Figure 9:
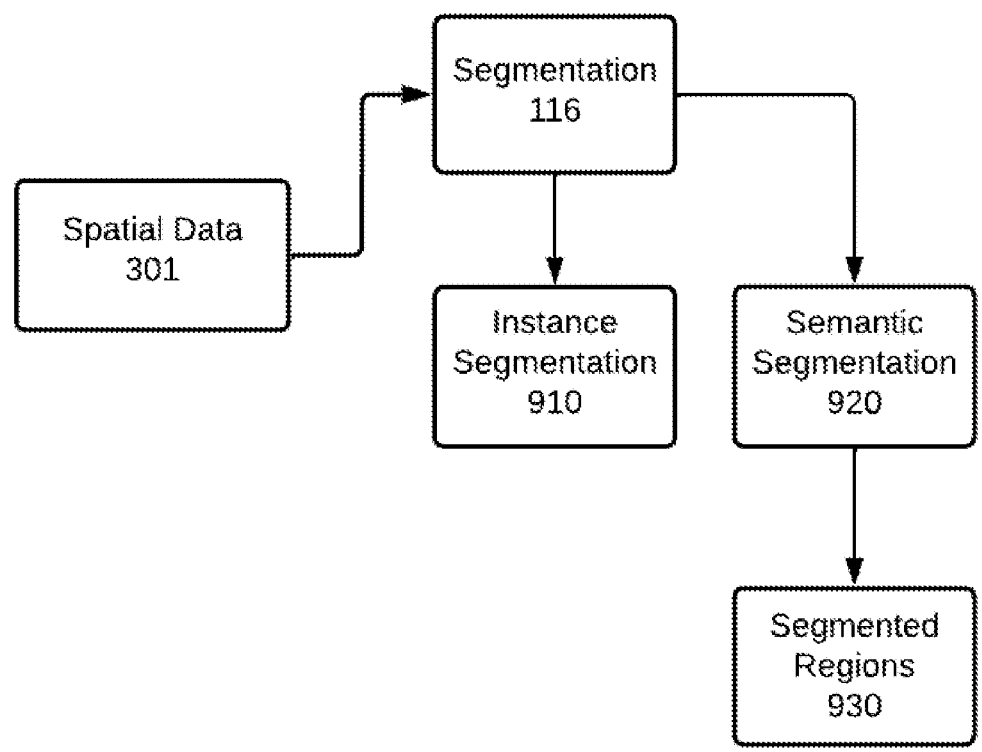
FIG. 9 shows the workings of another Machine Learning tool Segmentation.

Segmentation. FIG. 9 shows the workings of the Machine Learning 110 tool Segmentation 116. Segmentation 116 takes in the environment through Spatial Data 301 and segments the objects in that environment according to their types and classes. Different uses of this tool in other tasks include Action Recognition 118, Visual Overlay 1210, Redaction 1310 etc. The goal of this tool is to separate objects from one another on a granular level. For example, in a video frame of a household environment, identifying the pixels of a chair and a table and classifying them on the pixel level will enable a very precise decision of where the chair is and where the table is. Segmentation 116 models can be as precise as classifying every point of the objects in an environment. There are mainly two types of Segmentation, Instance Segmentation 910 and Semantic Segmentation 920. Instance Segmentation 910 is the segmentation based on objects' own entities in the environment and Semantic Segmentation 920 is the segmentation done based on the class of objects. In an environment, if there are two chairs, two desks and a table, then Instance Segmentation will treat them as five different objects and generate different pixel level identification for them. As for Semantic Segmentation 920, it will generate three classes of identification "chair", "desk" and "table" in the frame. As Semantic Segmentation 920 identifies objects based on class, it can be used to segment the environment into known classes as Segmented Regions 930. As segmentation enables identification of objects on a granular level, it grants better precision at monitoring the environment. Several programs are available for segmentation, such as U-net (Ronneberger, O., et al., T. (2015). U-Net: Convolutional Networks for Biomedical Image Segmentation. In: Navab, N., Hornegger, J., Wells, W., Frangi, A. (eds) Medical Image Computing and Computer-Assisted Intervention—MICCAI 2015. MICCAI 2015. Lecture Notes in Computer Science( ), vol 9351.

Figure 10:
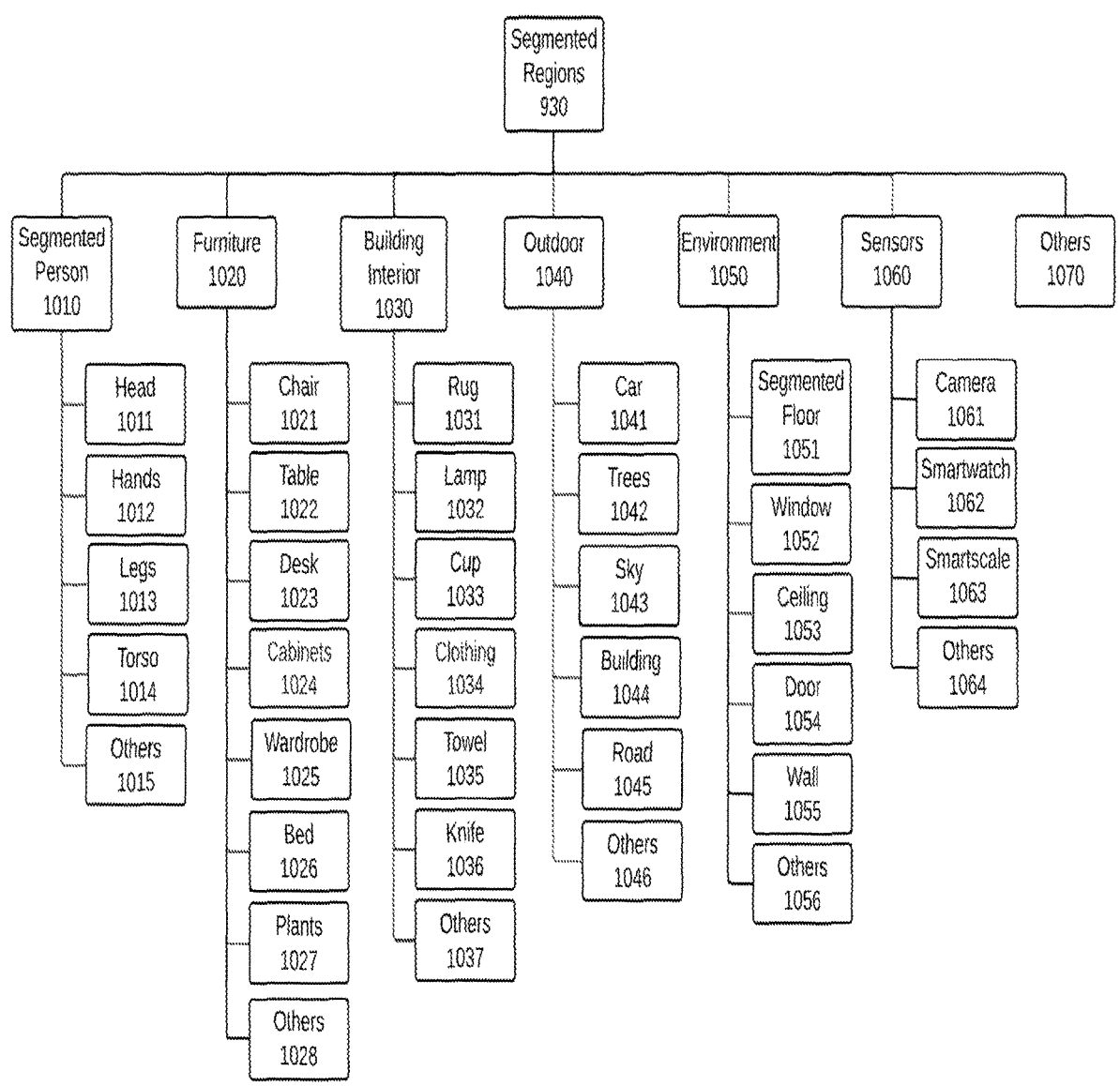
FIG. 10 shows the range of objects that can be segmented in different kinds of environments.

Segmented Regions. FIG. 10 shows the range of objects that can be segmented in different kinds of environments. Segmentation 116 is able to do classification of a broad range such as Humans 1010, Furniture 1020, Building Interior (such as household) items 1030, Outdoor objects 1040, Environmental 1050, Sensors 1060, and many others 1070. The use of this model extends to more precise classes like Head 1011, Torso 1014, Hands 1012, arms, Legs 1013, Hair etc. This model can also be used for segmenting different furniture in an indoor setting such as Chair 1021, Table 1022, Desk 1023, Cabinets 1024, Wardrobe 1025, Bed 1026, Plant 1027, and Others 1028. Segmenting the furniture allows a determination of whether other moving objects in the environment are interacting with them. Other indoor items include Rugs 1031, Lamp 1032, Cups 1033, Clothing 1034, Towels 1035, Knives 1036 and Others 1037. Segmentation models are applicable in outdoor scenarios too for segmenting Cars 1041, Trees 1042, Sky 1043, Buildings 1044, Roads 1045, signs, signals, shops and many more 1046. Not limited to definite objects, the segmentation model can detect background entities such as Floor 1051, Windows 1052, Ceiling 1053, Door 1054, Walls 1055, and Others 1056. The segmentation model can also detect Sensors 1060, including Camera 1061, Smartwatch 1062, Smart Scale 1063, and Others 1064. These classifications hold a lot of information about the environment and can be used in various tasks.

Figure 11:
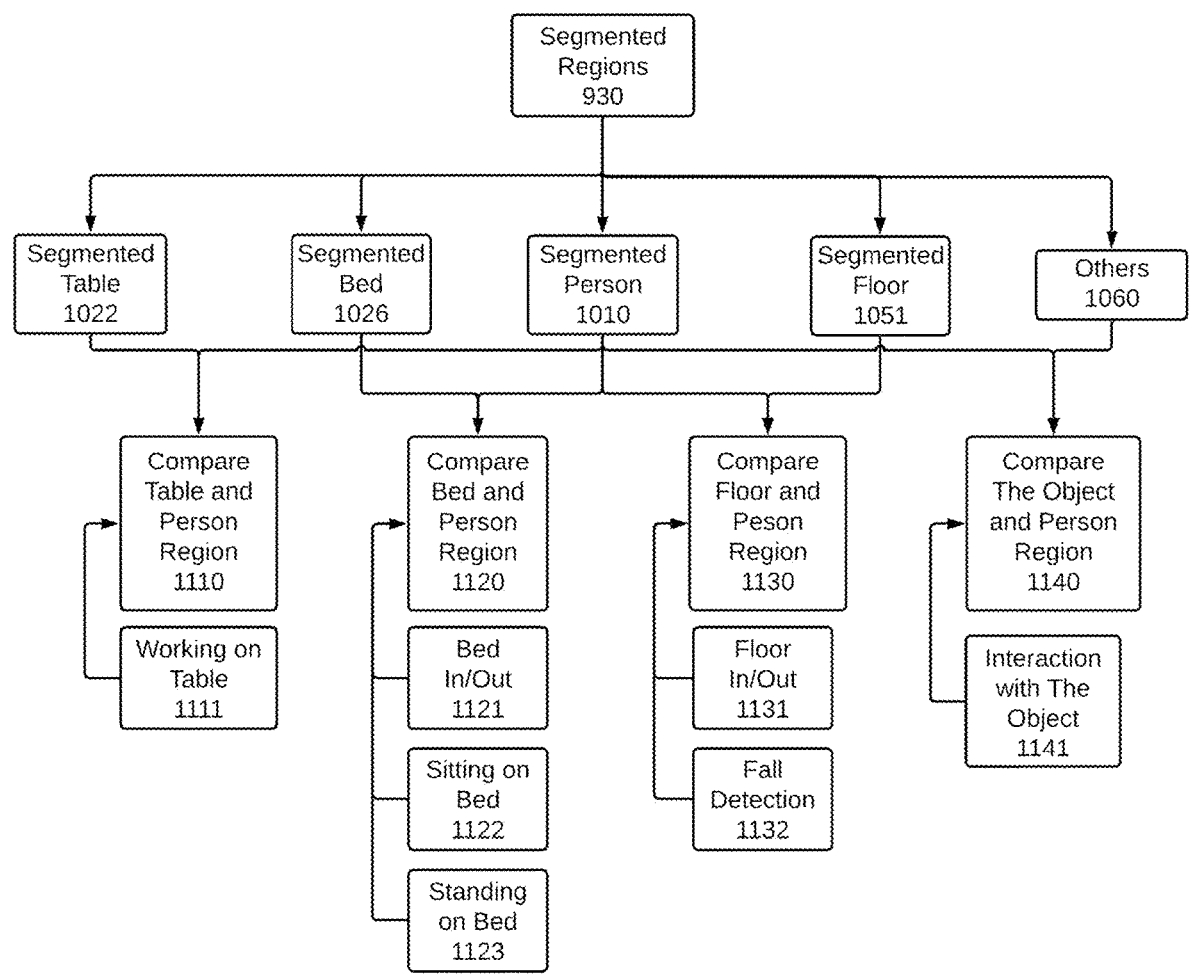
FIG. 11 illustrates how different segmented regions and their interaction can be used to determine action recognition.

Action Recognition From Segmentation Regions Interaction. FIG. 11 illustrates how Segmented Region 930 determines the Machine Learning 110 Task Action Recognition 118. Segmented Regions makes the Action Recognition 118 more robust and accurate. Table 1022, Bed 1026, Human 1010, Floor 1051 and Others 1060 May be obtained from Segmented Regions 930. Comparing any other segmentation region with Human 1010, an interaction may be inferred between the object and the person. By comparing Table 1022 and Human 1010 through Compare Table and Human Region 1110, Working on Table 1111 action may be inferred. And comparing Bed 1026 and Human 1010 through Compare Bed and Human Region 1120, whether the person is Bed In/Out 1121 or Sitting on Bed 1122 or Standing on Bed 1123 May be inferred. Then in a similar manner, from Compare Floor and Human Region 1130, two actions may be inferred, namely, Floor In/Out 1131 and Fall Detection 1132. This method can be extended to any other object; for example: Chair 1021, Cabinets 1024, Wardrobe 1025, Lamp 1032, Knife 1036, Window 1052 and many others. Comparing the object and Human Region 1140, Interaction with The Object 1141 is obtained, which enables extending it with any other object.

After two of the desired segmented regions are obtained, the overlapped regions of these two are checked. If the overlapped region passes the threshold value and preset conditions, it can be determined that those two objects are close and there is an interaction between them. For example, if a segmented region of a treadmill and a person are obtained, then by comparing them an overlapped region may be obtained, or if the person segmented region is perpendicular to the treadmill segmented region, then it can be concluded that the person is using the treadmill. And then analyzing the movement speed of the person's segmented region, it can be determined whether the person is standing, walking, or running on the treadmill. If the action category output is used from comparing two segmentation regions with the output generated from Machine Learning 110 task Action Recognition 118, then a robust and more precise action classification can be made.

Figure 12:
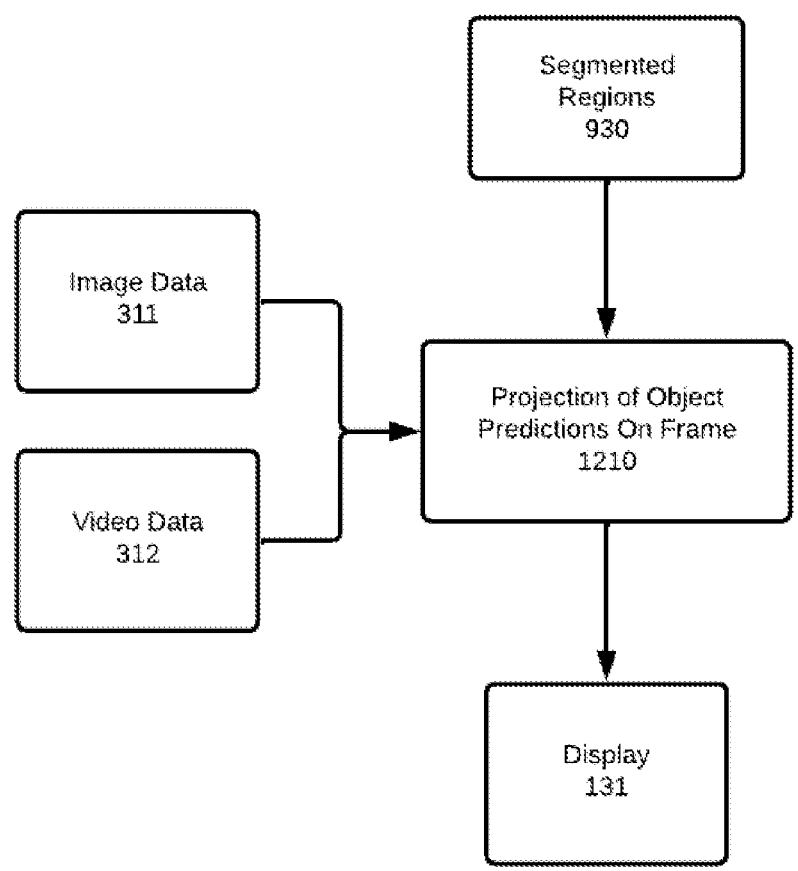
FIG. 12 illustrates the usage of how segmentation regions can be used on input data to create different visualizations.

Visual Overlay. FIG. 12 demonstrates the usage of segmentation on the visualization aspect of tasks. Generally, monitoring systems often require a fair amount of assisted visualization to be effective. Segmentation comes in to solve that challenge. As different objects in the environment can be segmented and identified, objects can be highlighted to be more in focus than other objects of less importance in Display 131. The objects can be color-coded in the visualization to create higher level representations. For example, color coding the floor as red and the bed as green might help an observer understand that an individual lying down on the floor might be dangerous and lying down on the bed is safe.

Figure 13:
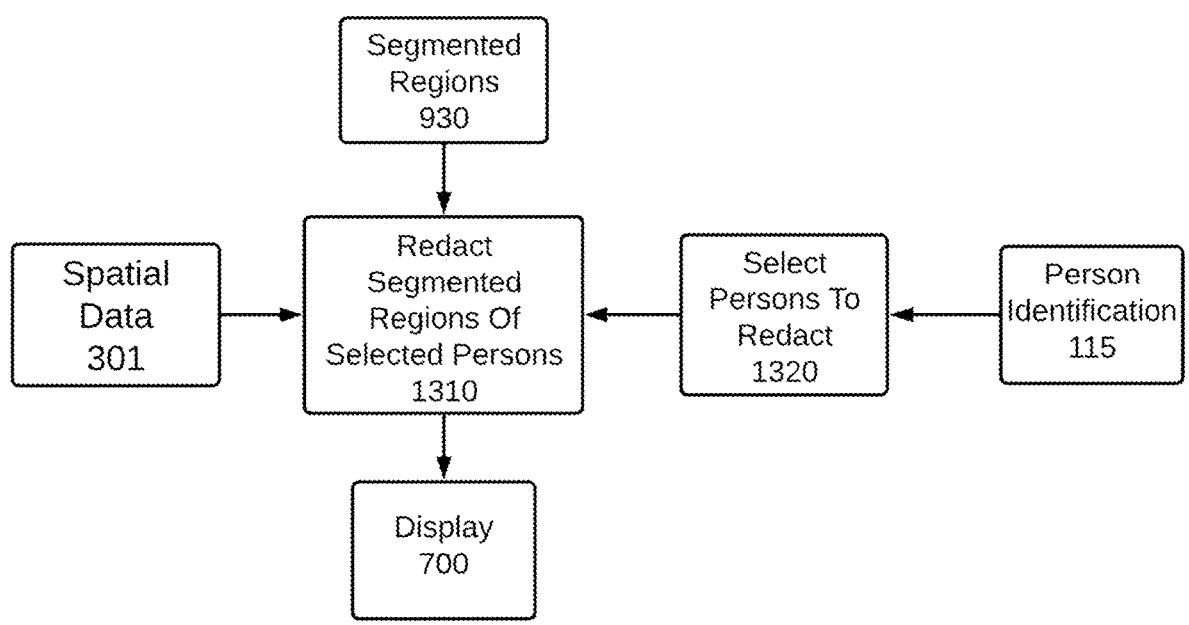
FIG. 13 illustrates how an individual's segmentation region can be redacted and preserve privacy of that individual.

Redaction. FIG. 13 shows another application of segmentation in a monitoring task. One aspect of monitoring tasks is ensuring the privacy of the individuals being monitored is preserved at all times.

Figure 15:
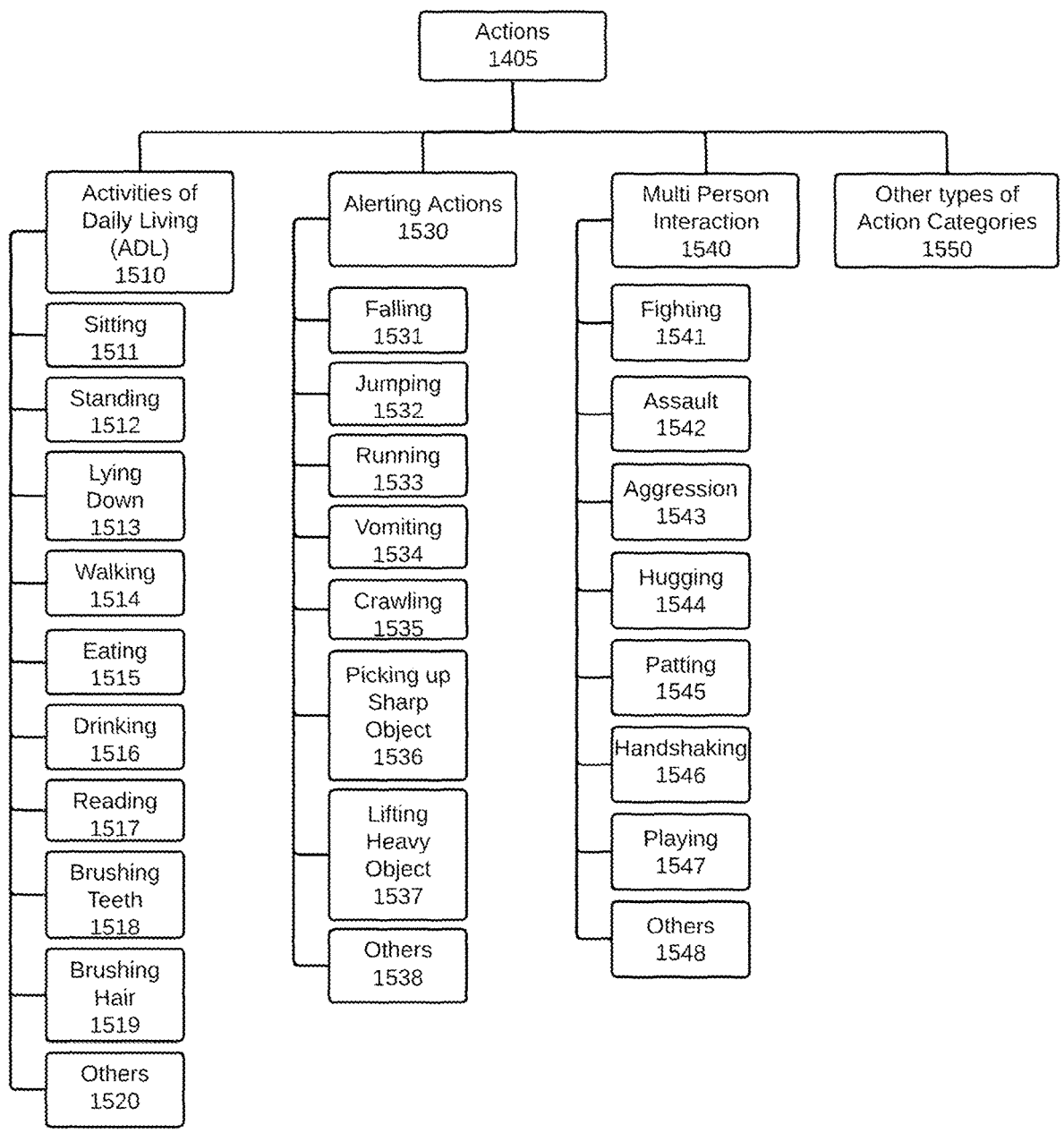
FIG. 15 illustrates a long list of actions that can be recognized by an action recognition model.
Figure 16:
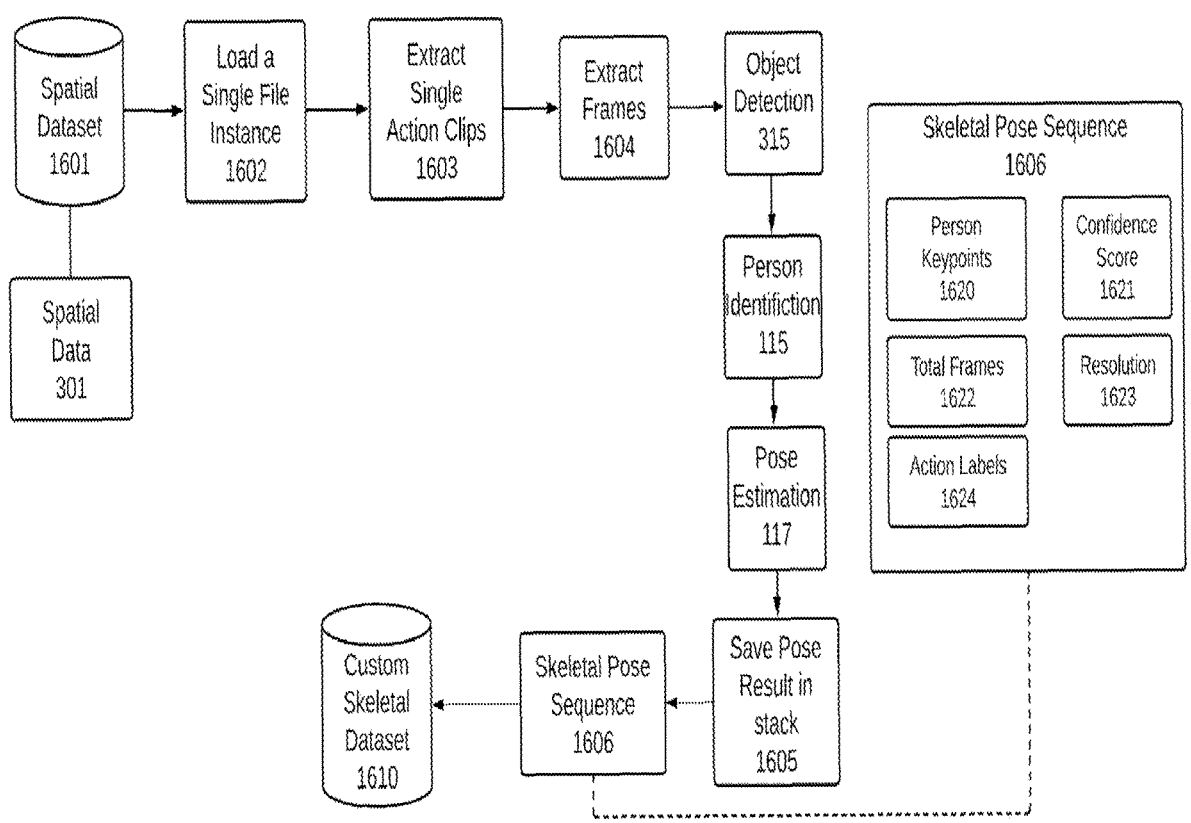
FIG. 16 illustrates the task of preparing a skeletal dataset from a given spatial dataset.
Figure 17:
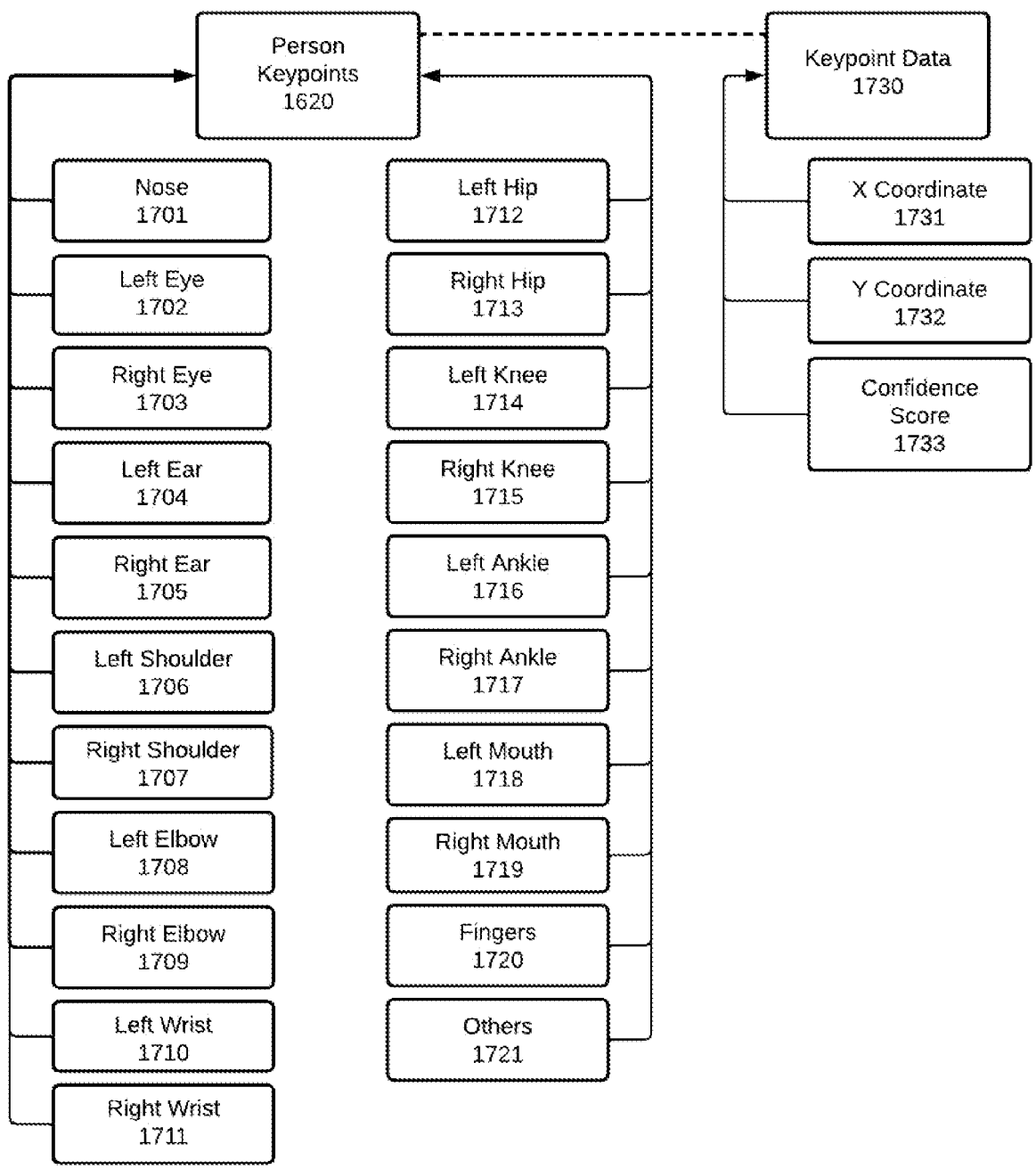
FIG. 17 illustrates the list of body keypoints which are estimated by a pose estimation model and the list of values stored in every keypoint.
Figure 22:
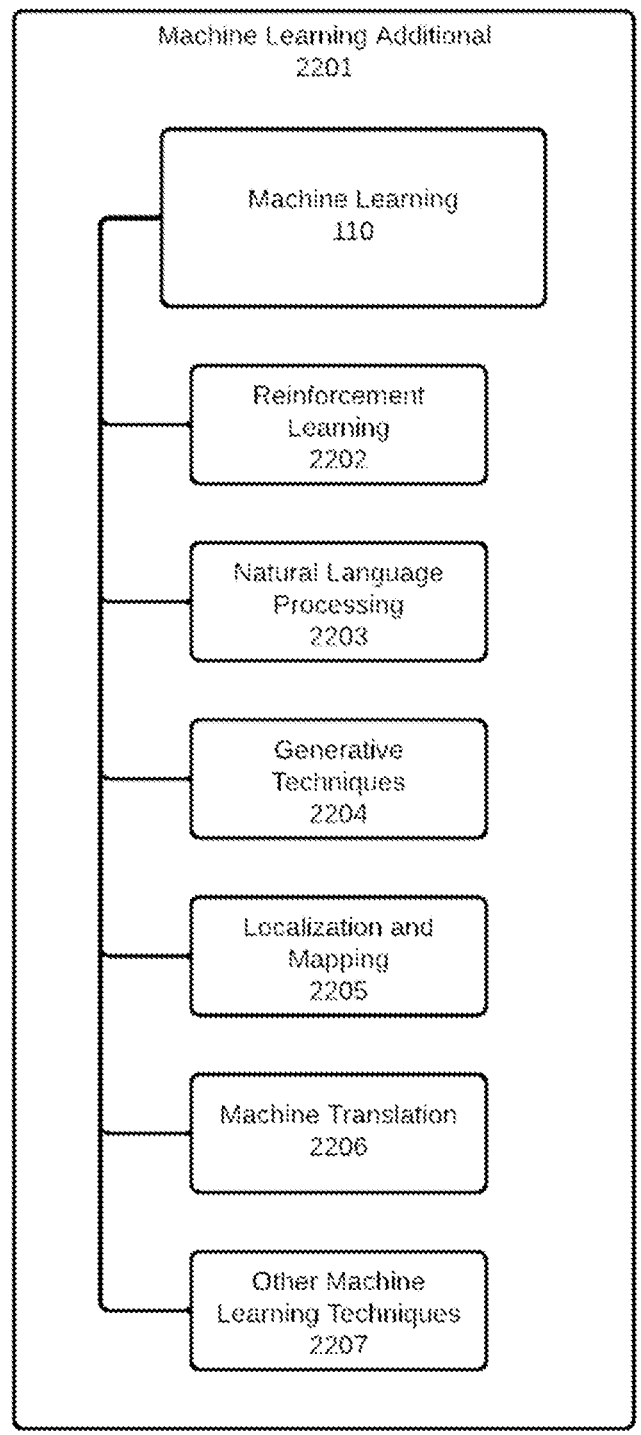
FIG. 22 shows additional machine learning models for augmenting the capabilities of the monitoring system.
Figure 23:
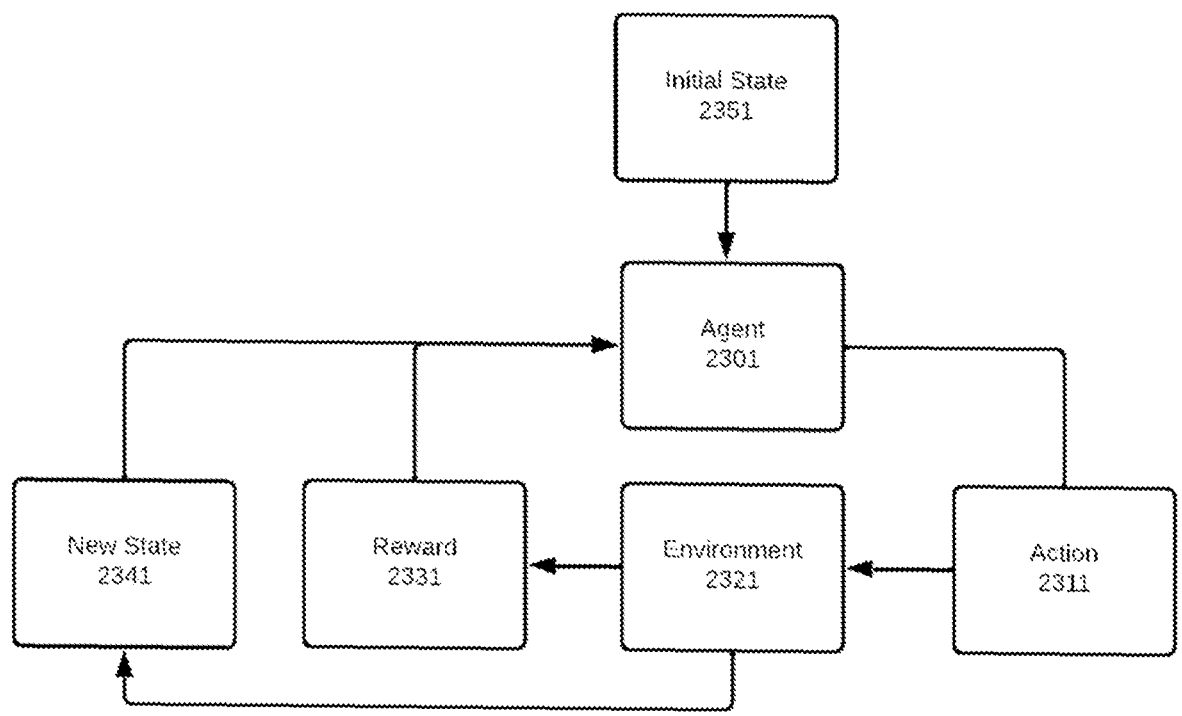
FIG. 23 shows the process of learning to make decisions by trial and error represented by reinforcement learning.
Figure 25:
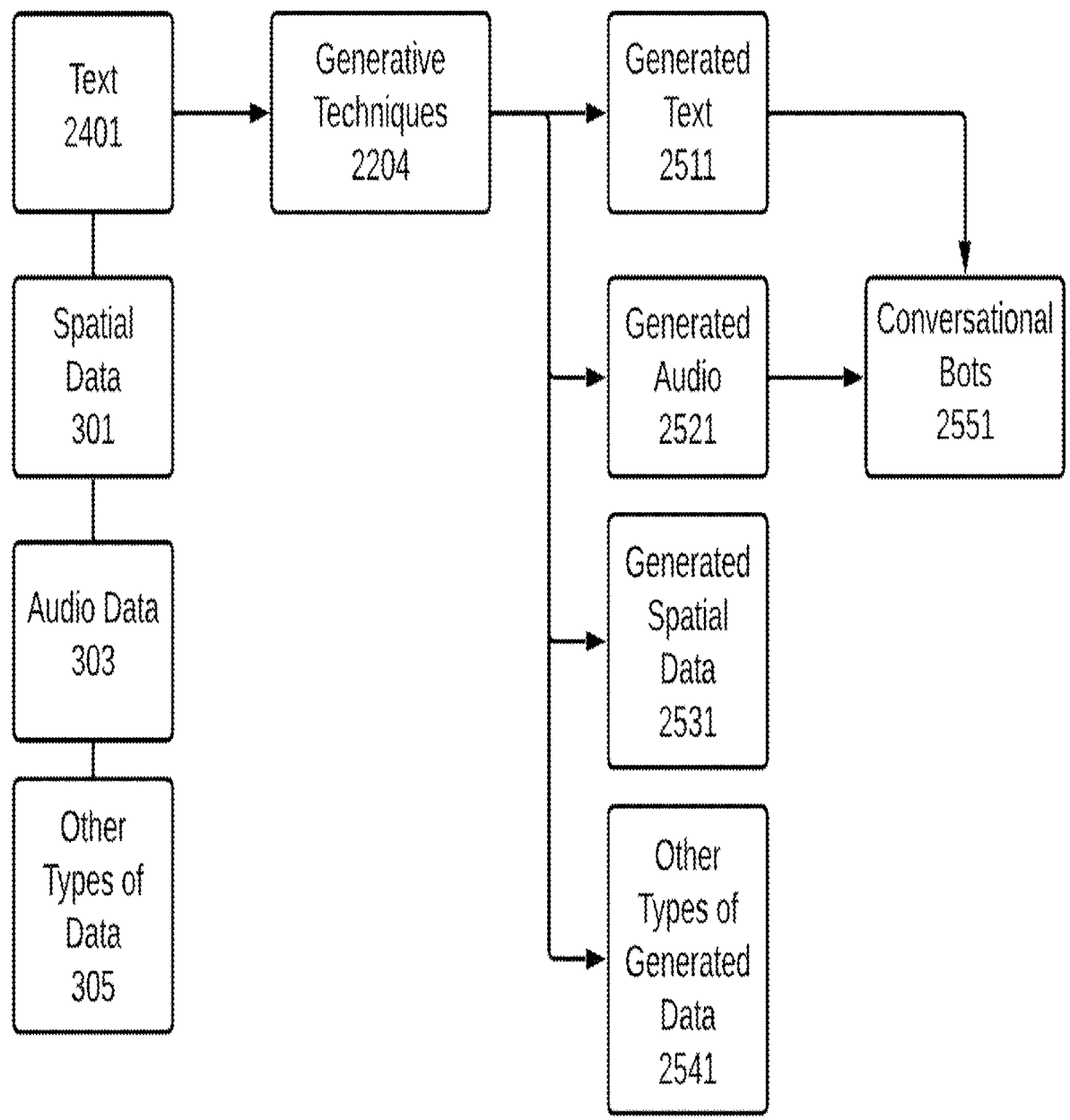
FIG. 25 illustrates generative techniques.

The use and processing of video information in a protected health information environment is described in U.S. Pat. No. 11,475,983, entitled "HIPAA-compliant Computer Security Method And System For Recording Visual Personal Health Information In An Electronic Format Relating To At Least Two Individuals, At Least One Of Whom Is An Individual Under Care, From A Video Camera, And Preventing Unauthorized Access Of A User To The Information," which is incorporated by reference in its entirety. In particular, FIG. 14 of U.S. Pat. No. 11,475,983, and the accompanying text at Column 40, line 18 to Column 43, line 33 of that patent, describe the use of caseloads to provide HIPAA-compliant access to the video information of an individual under care. FIGS. 15 and 15a-c of U.S. Pat. No. 11,475,983, and the accompanying text at Column 43, line 34 to Column 45, line 49 of that patent, describe how raw video footage may be modified by blurring, redacting, or other methods so that a user may obtain access to video information to which the user has authorized access while limiting access to unauthorized information. FIGS. 16 and 16a-c of U.S. Pat. No. 11,475,983, and the accompanying text at Column 45, line 50 to Column 46, line 27 describe how these and other methods may be used for incident reporting. FIGS. 17, 17a, and 22 of U.S. Pat. No. 11,475,983, and the accompanying text at Column 46, line 28 to Column 48, line 52 describe how these and other methods may be used for collecting data on Individual Service Planning and incident reporting. FIGS. 18 and 18a-d of U.S. Pat. No. 11,475,983, and the accompanying text at Column 48, line 53 to Column 50, line 26 describe how these and other methods may be used for reporting an altercation incident. FIGS. 23 and 25 of U.S. Pat. No. 11,475,983, and the accompanying text at Column 51, line 60 to Column 54, line 59 as well as Column 55, line 37 to Column 56, line 8 describe implementation and monitoring, including video monitoring, of Health Care Plans for individuals, and the infrastructure of that supports a monitoring system.

With respect to FIG. 13 herein, using Person Identification 115, the system can determine which individuals are in the environment, and with additional information about who is monitoring the individual, it can be determined if the observer is allowed to see the individual. As it is not preferable to obstruct the movements of the individual being monitored, it is preferable to be able to redact (or otherwise obscure) that individual from the images presented to the observer (Display 700). As discussed above, caseloads may be used to determine if an individual, or individuals, should be redacted or not (Select Persons to Redact 1320), which may also use Spatial Data 301 as discussed above. The system may aggregate the segmentation regions from one modality of data and use that to redact the individual from another modality of data. For example, segmented regions 930 from Thermal Camera 216 can be used to redact individuals in video frames 312. The redaction can be done by replacing person pixels with black pixels, distorting the region, blurring by adding mosaic censorship, and so on, and as discussed with respect to U.S. Pat. No. 11,475,983 above. This post processing 122 allows including flexible privacy preserving elements into the monitoring system.

Figure 14:
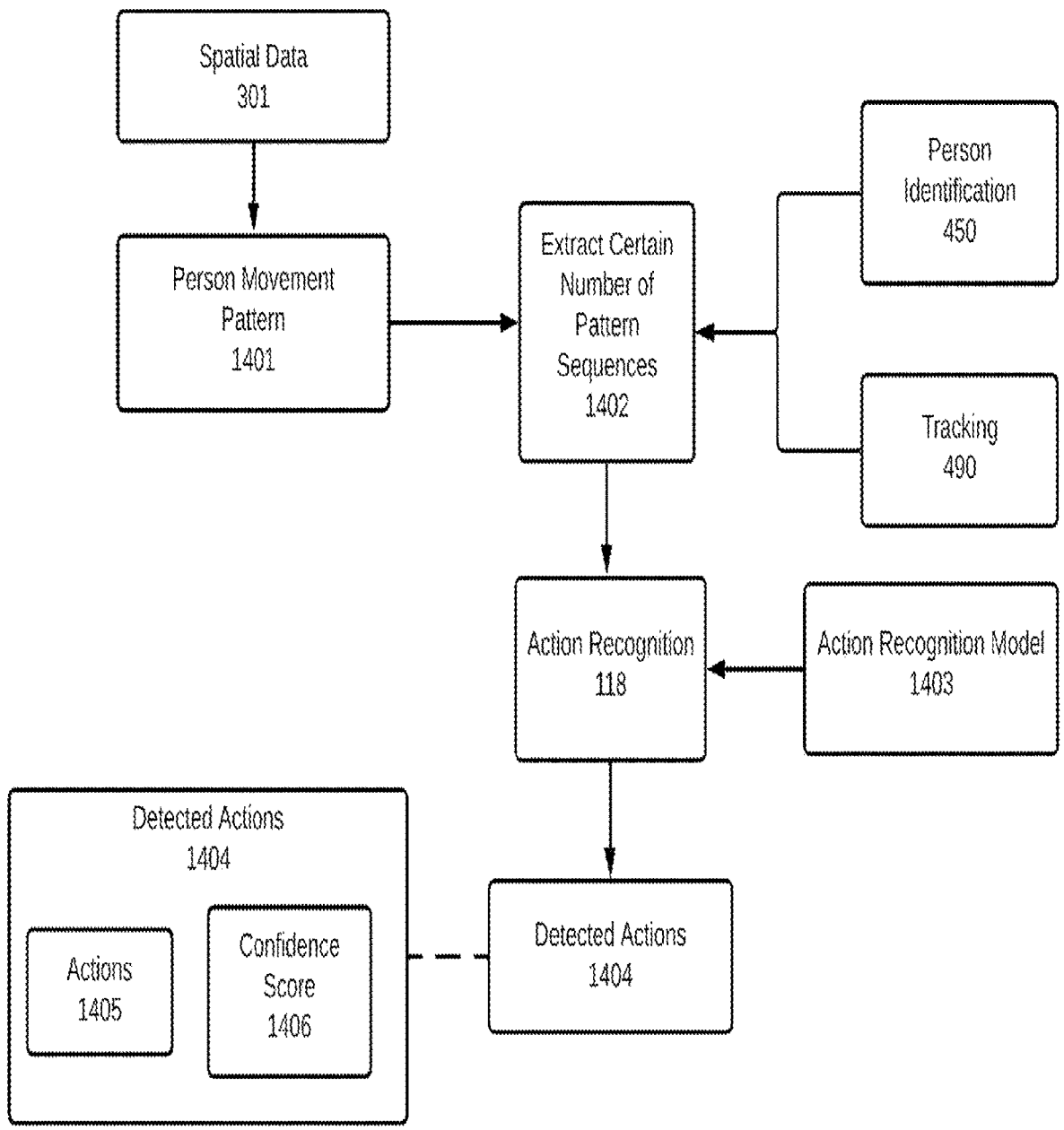
FIG. 14 illustrates the task of action recognition from sequences of spatial data.

Action Recognition. FIG. 14 illustrates Action Recognition 118. It takes certain sequences of spatial movement patterns of a person and, using the Action Recognition Model 103, outputs the Detected Actions 1404. The movement pattern can be in the same media as Spatial Data 301. Some of them are Image Data 311, Video Data 312, and Skeletal Pose 315. The movement pattern is the output of Extract Certain Number of Pattern Sequences 1402 which takes Person Movement Pattern 1401 as input and processes the pattern to filter out the desired person by using Person Identification 450 method and Tracking 490. Person Movement Pattern can be a subset of Spatial Data 301. Action Recognition Model 1403 will be different based on the Spatial Data 301. For example, the model and algorithm for RGB 321 will be different for the model and algorithm for Skeletal Pose 315. Detected Actions 1404 represent the class or type of action that was recognized. There are different machine learning models for action recognition depending on the modality of spatial data, such as Pose3D which predicts actions based on pose estimation, as described in H. Duan et al., Revisiting Skeleton-based Action Recognition, available at arxiv.org/abs/2104.13586.

In a surveillance and monitoring task, action recognition can be a very useful tool as it can be used to recognize a certain person's activity remotely. Investigators can monitor the exam hall to detect if any student is behaving improperly. Authorities can monitor prisons to detect if any fights or assaults are happening. Doctors and nurses can monitor multiple patients at a time with ease using this tool. Detected Actions 1404 has two aspects. The first one is Actions 1405 and the second one is Confidence Score 1406. Actions 1405 is the list of all actions the model can recognize, and Confidence Score 1406 is the likelihood of the action happening. For example, a model can recognize three actions, sitting, standing, lying down. Now if a person is in the transition period from lying down to sitting, the Confidence Score might look like, sitting=0.80, lying down=0.20, standing=0.00. The confidence score can be used in more ways. If in a scenario, multiple actions have very close confidence scores then Segmented Regions 930 can be used to determine the most likely action. In this way, the combinations of different methods with Action Recognition 118 will gives more robust outputs.

Actions. FIG. 15 shows an extensive list of Actions 1405 recognized by Action Recognition 118. Using the action recognition model, a wide range of actions can be recognized like Activities of Daily Living (ADL) 1510, Alerting Actions 1530, Multi Person Interaction 1540 and Other types of Action Categories 1550. Recognizing Activities of Daily Living (ADL) 1510 is an important task as most of the daily activities include the actions Sitting 1511, Standing 1512, Lying Down 1513, Walking 1514, Eating 1515, Drinking 1516, Reading 1517, Brushing Teeth 1518, Brushing Hair 1519 and others 1520. Probably the most useful recognizable action category is Alerting Actions 1530 which includes a handful of actions which are associated with injury, illness, or harm. The action recognition model can categorize Falling 1531, Jumping 1532, Running 1533, Vomiting 1534, Crawling 1535, Picking up Sharp Object 1536, Lifting Heavy Object 1537 and so on. It can also recognize some violent actions such as Fighting 1541, Assault 1542, Aggression 1543 which fall into Multi Person Interaction 1540 category. Some other multi person actions are Hugging 1544, Patting 1545, Handshaking 1546, Playing 1547 and Others 1548. The capability of the action recognition model can be extended to recognize more and more actions.

Generalized Skeletal Dataset Preparation. FIG. 16 represents the task of preparing a skeletal dataset from any Spatial Data 301. The advantage of skeletal data is that any spatial dataset can be converted to skeletal form. Also, skeletal data is light in volume compared to RGB 321 or depth 322, as it requires less space to store and makes Action recognition 118 faster. Here Spatial Dataset 1601 contains Spatial Data 301. In the dataset, there can be thousands, even millions of single file instances. A single file instance can be certain seconds long and there can be hundreds of spatial frames. So, these file instances are taken one-by-one and converted into Skeletal Pose Sequences 1606. First file instance 1602 is loaded and single action clips 1603 are extracted. A single action clip contains only one action happening in it. It will be around 4-7 seconds long and there will be 100-300 frames. Then frames 1604 are extracted from the single action clips. After that, objects in each frame 440 are detected, Person 523, is identified, and Skeletal Pose 315 is estimated. The result is saved in a stack 1605 until all the frames of the single action clips are finished converting. Finally, the stack result is clipped together as a Skeletal Pose Sequence 1606. After converting all the file instances of the Spatial Dataset 1601, the resulting Custom Skeletal Dataset 1610 is ready to be used to build or to finetune a model. A Skeletal Pose Sequence 1606 contains several pieces of information. It stores the Person Keypoints 1620 and Confidence Score 1621 for every person in every frame in an order. It also saves the number of frames 1622 the single action clips had. It also stores the resolution 1623 of the frames. Action Labels 1624 are also stored.

Person Keypoint. FIG. 17 represents the list of body key points which are estimated by Pose Estimation 117. Person Keypoints 1620 include a wide range of body key points which are essential for getting the clear posture and gesture of a person. It includes points from upper body parts which are Nose 1701, Left Eye 1702, Right Eye 1703, Left Ear 1704, Right Ear 1705, Left Mouth 1718, Right Mouth 1719, Left Shoulder 1706, Right Shoulder 1707, Left Elbow 1708, Right Elbow 1709, Left Wrist 1710, Right Wrist 1711. And the lower body parts Left Hip 1712, Right Hip 1713, Left Knee 1714, Right Knee 1715, Left Ankle 1716, Right Ankle 1717. Fingers 1720 are also detected here. And there can be other body key points as well. Any number of keypoints can be connected in the right order to get any section of the body. For example, if it is desired to get the area in an image where the person's right arm is located, then the Right Shoulder 1707 and the Right Wrist 1711 can be connected to get that.

Keypoint Data 1730 represents the data contained in each Person Keypoint, namely X Coordinate 1731, Y Coordinate 1732 and Confidence Score 1733. X Coordinate 1731 and Y coordinate 1732 are pixel values as the image on which pose is estimated is a 2D image. Confidence Score 1733 indicates how confident the pose estimation model is for assigning specific coordinates for that particular Person Keypoint. The confidence score of a Person Keypoint can vary depending on the visibility of a person's body, shadow, and color.

Figure 18:
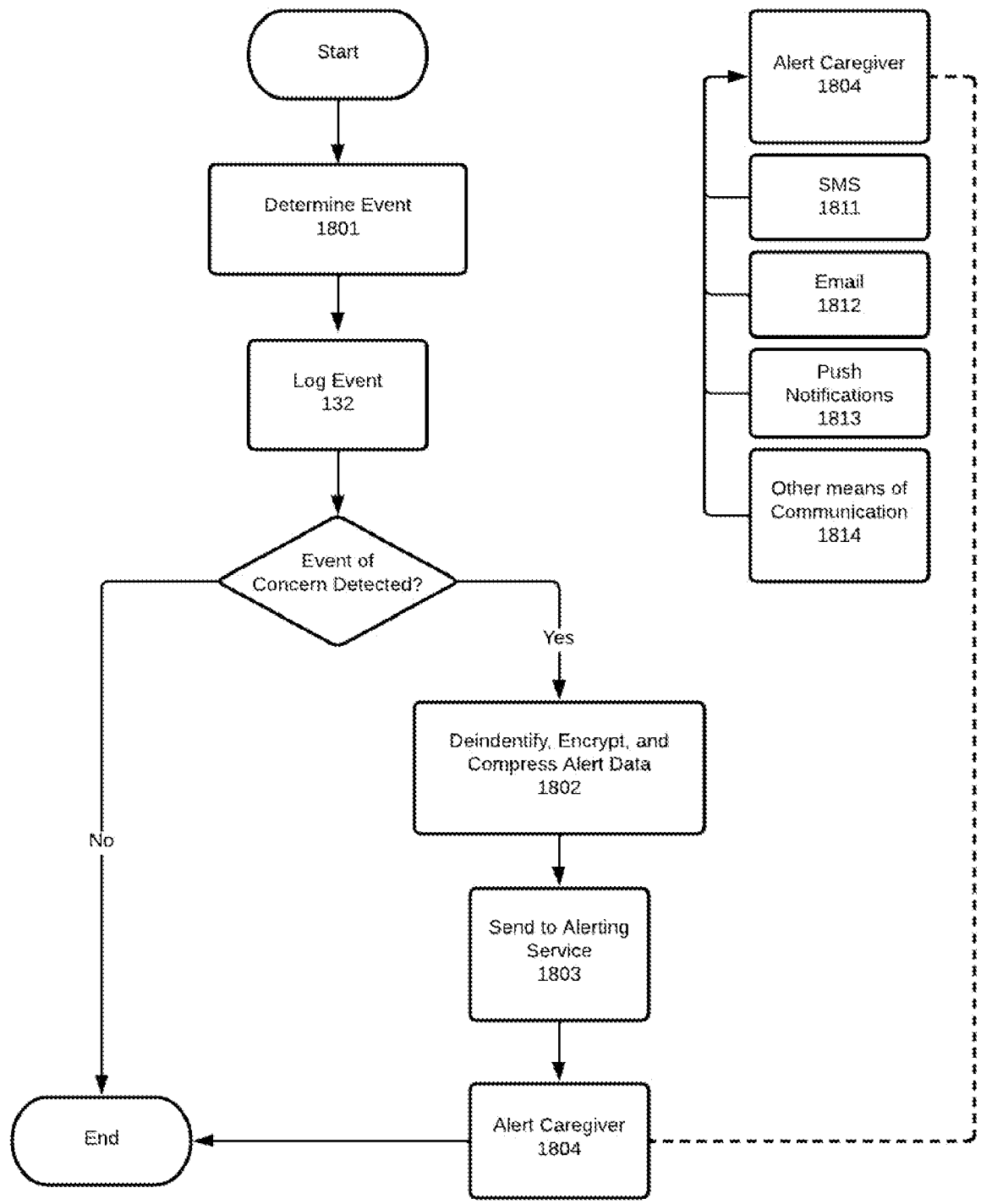
FIG. 18 illustrates the task of alerting responsible authority and caregiver based on determined events.

FIG. 18 illustrates the notification process in the monitoring system. In a monitoring system, the inclusion of visualizations and logging is important, but it may not account for emergency situations. For example, if some form of accident occurs such as an individual falling to the floor, the system might be able to determine and document it, but it is not enough as the individual is not getting any help simultaneously. In such a situation, it may be necessary for the system to get the help of the involved authorities to the environment where it is needed. The process starts with Determining the event 1801, and then logging the event accordingly. The event information is logged 132 against the details of the environment (i.e., the room number, building, facility) and the individuals in the environment. After logging, the event is analyzed to determine if it should be of concern. This can be done based on heuristic analysis and depends mostly on the context of the environment. For example, if actions are detected in the environment, the system can check if the action is dangerous or not, such as individuals walking around is not concerning but multiple individuals engaging in a fight is. If such an incident is detected, the system triggers a notification. First, identities in the incident are encrypted and deidentified (Deidentify, Encrypt, and Compress Alert Data 1802) according to caseloads and the access of the authorities concerned. The encrypted alert notification is then sent to the Alerting Service 1803, which in turn is sent to the authorities as an Alert 133. An Alert 133 may be communicated by SMS 1811, Email 1812, Push Notifications 1813, Speaker 1814, or Other Means of Communication 1815. This enables the system to involve the people responsible as soon as possible. The alerting achieves two things, one is allowing the authority to not monitor the individuals all the time and still ensure their safety, and the other is bringing help in real time without any latency between the incident and getting help. So, with the proposed system implemented throughout a facility, it is preferred that manual monitoring will not be needed.

Figure 19A:
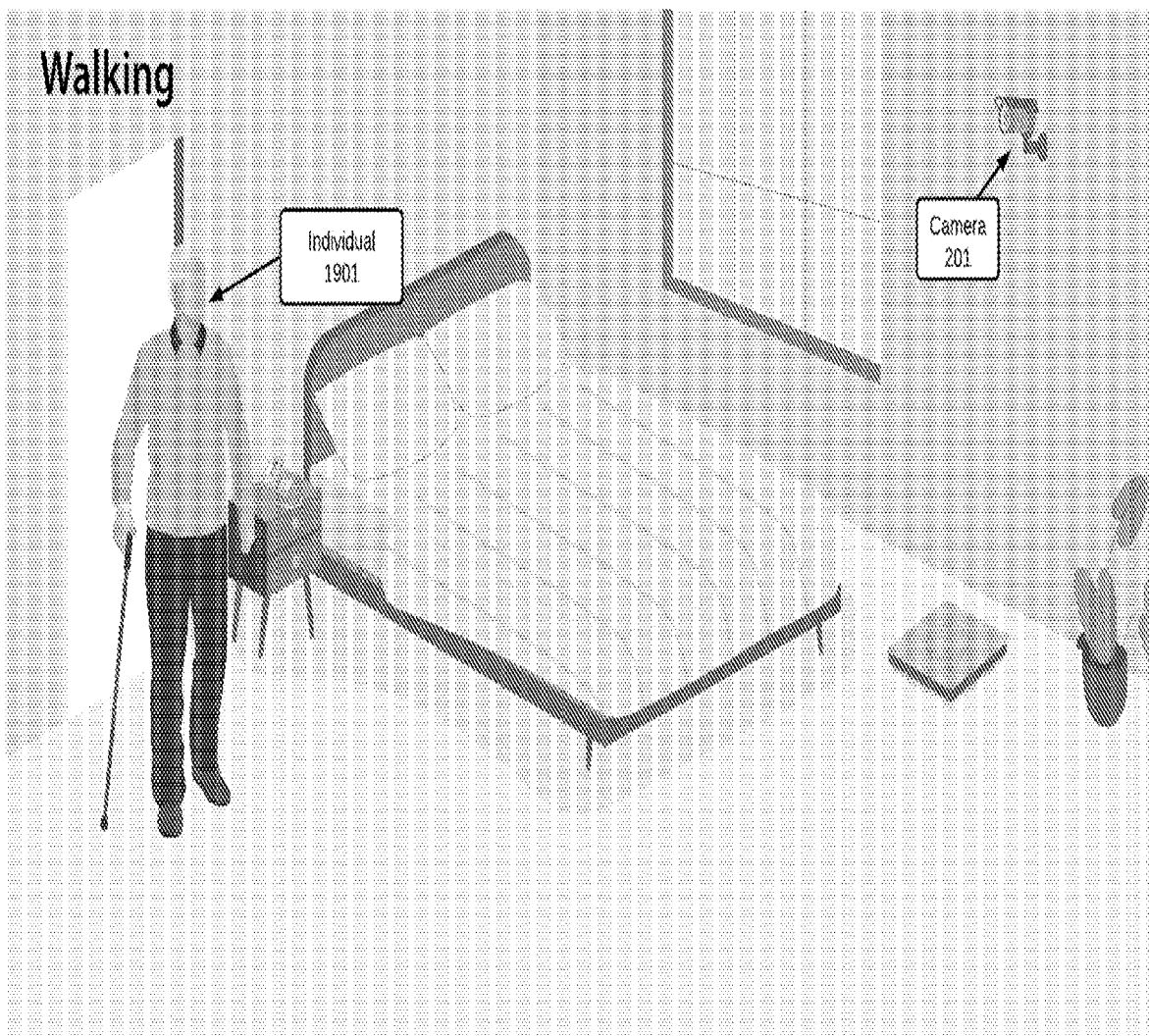
FIG. 19A represents a sample image of an individual walking.
Figure 19B:
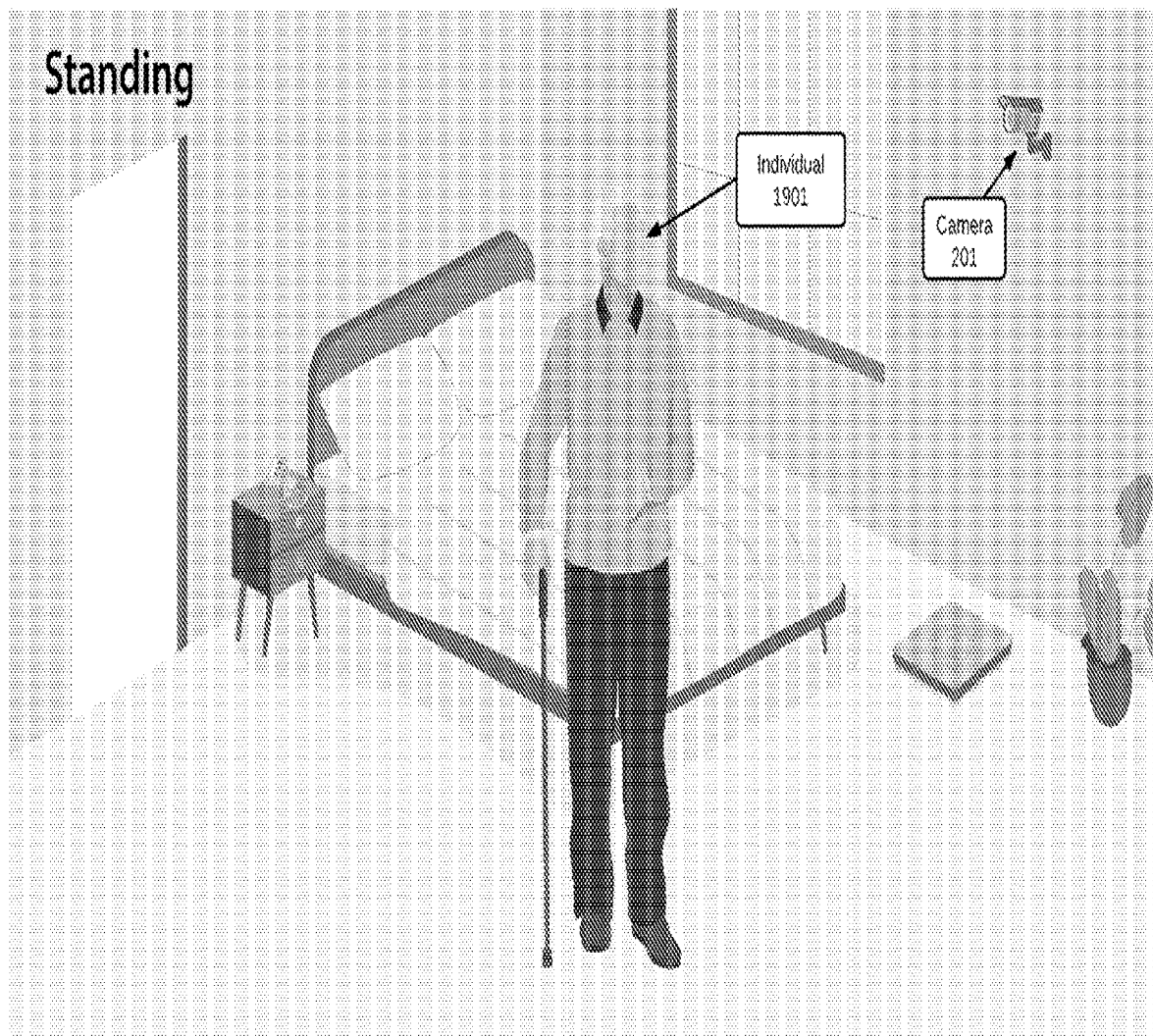
FIG. 19B represents a sample image of an individual standing in a room.
Figure 19C:
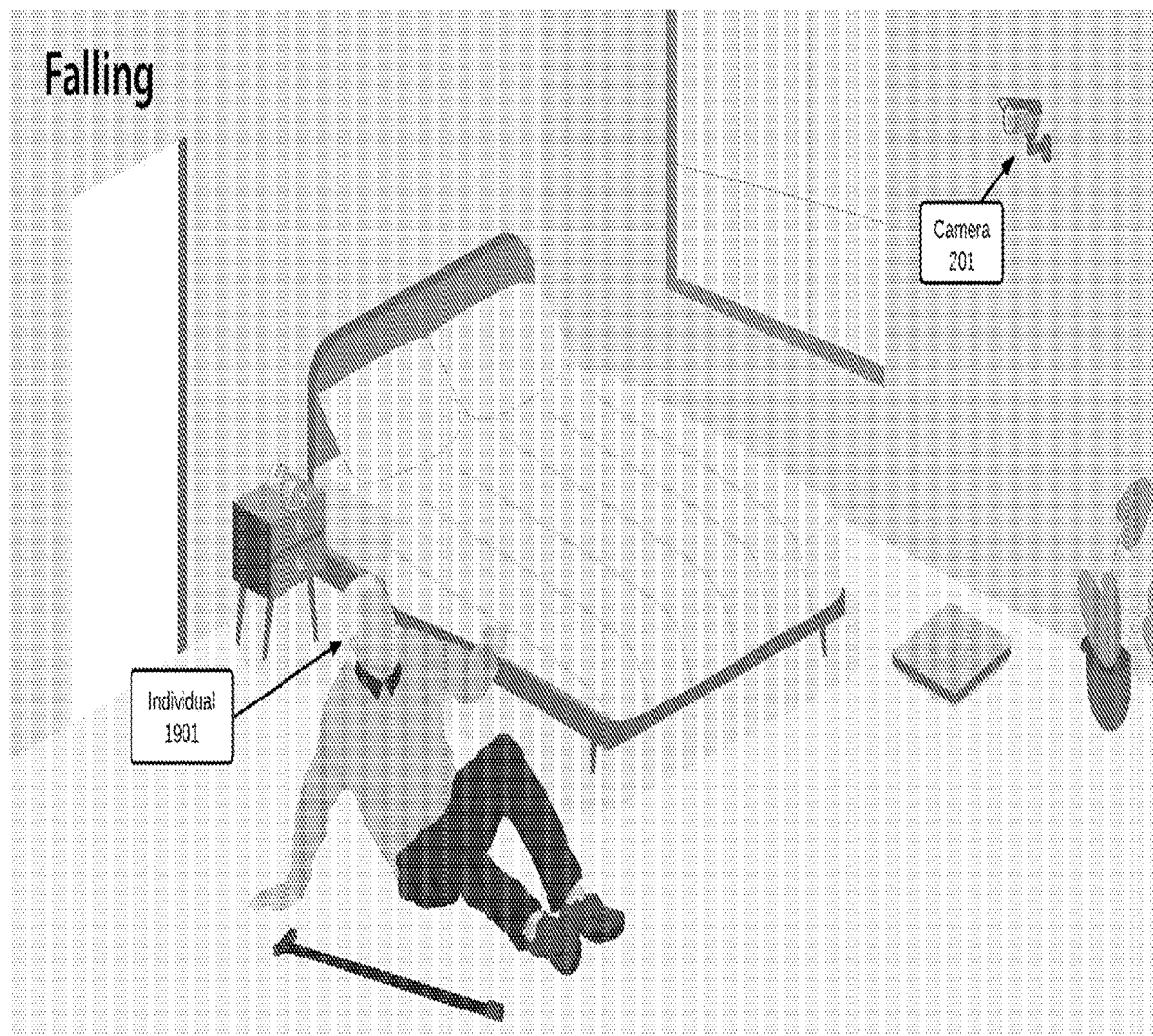
FIG. 19C represents a sample image of an individual falling down on the floor.
Figure 19D:
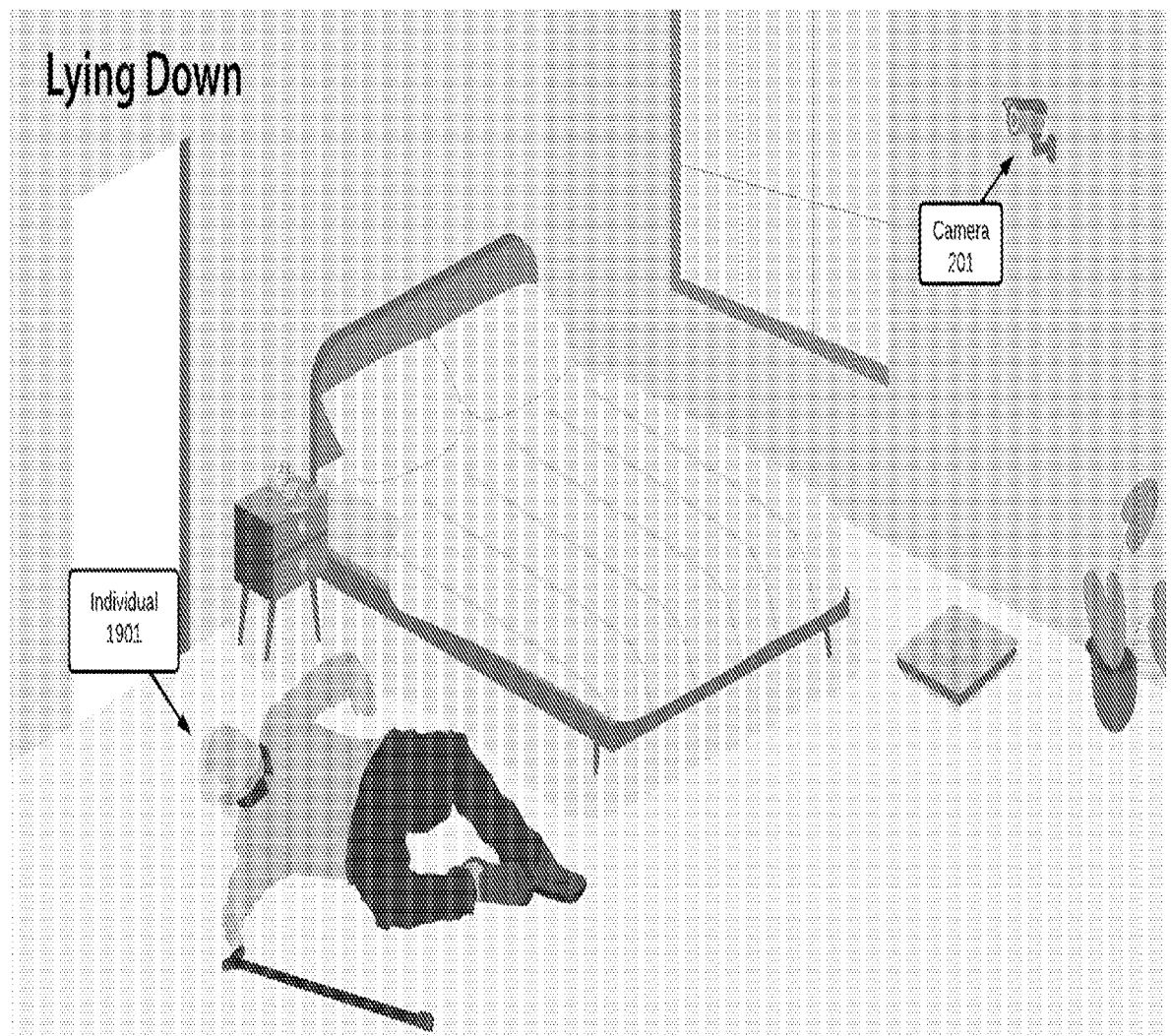
FIG. 19D represents a sample image of an individual lying on the floor.

FIG. 19A represents a sample image of an individual 1901 (Person 523) walking in a room. FIG. 19B represents a sample image of an individual 1901 standing in a room. FIG. 19C represents a sample image of an individual 1901 falling down on the floor. FIG. 19D represents a sample image of an individual 1901 lying on the floor. The system is capable of recognizing all of the above-mentioned actions from an image or a video feed efficiently using its underlying Action Recognition 118 model.

Figure 20A:
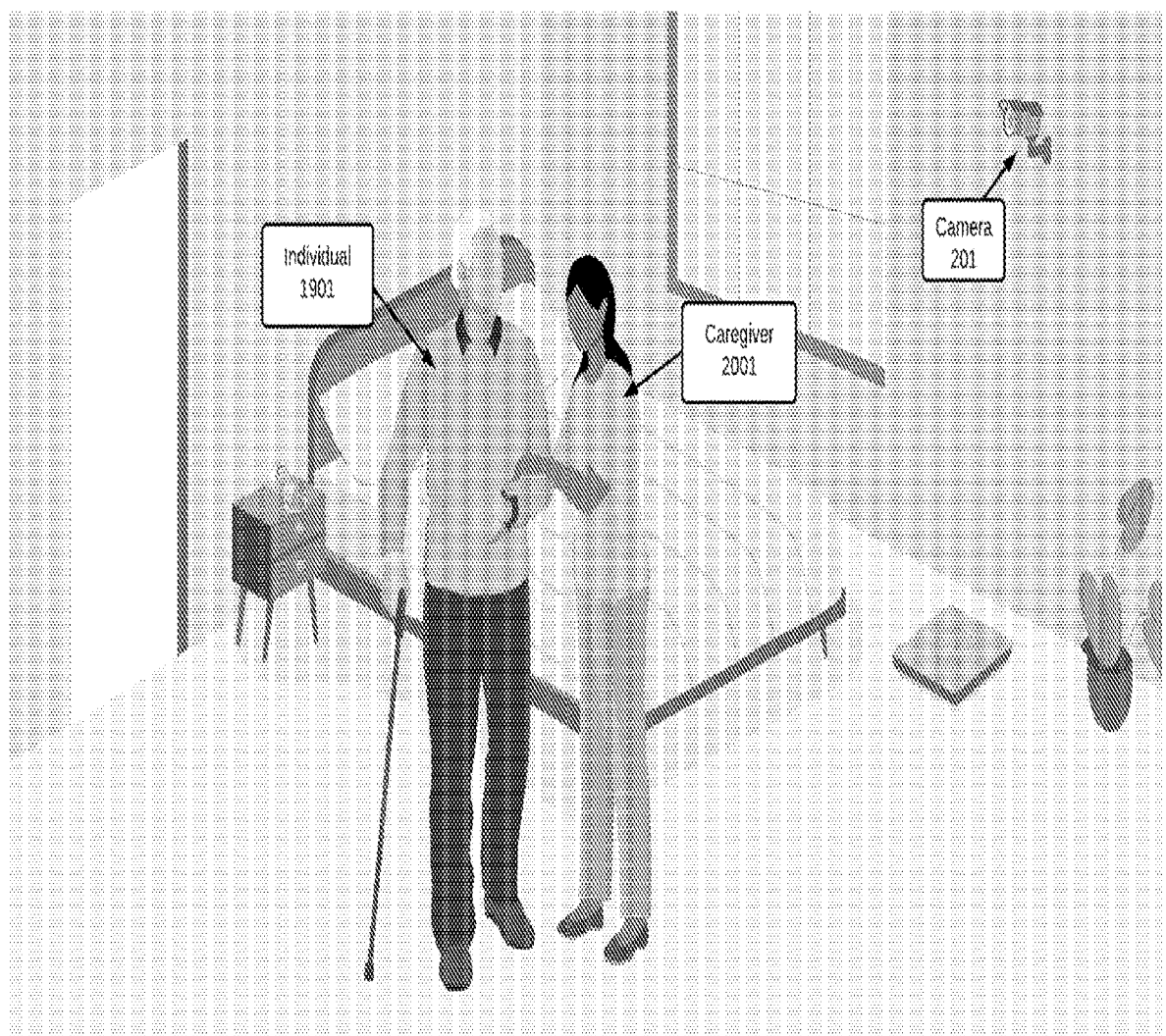
FIG. 20A represents an individual being assisted by a caregiver.
Figure 20B:
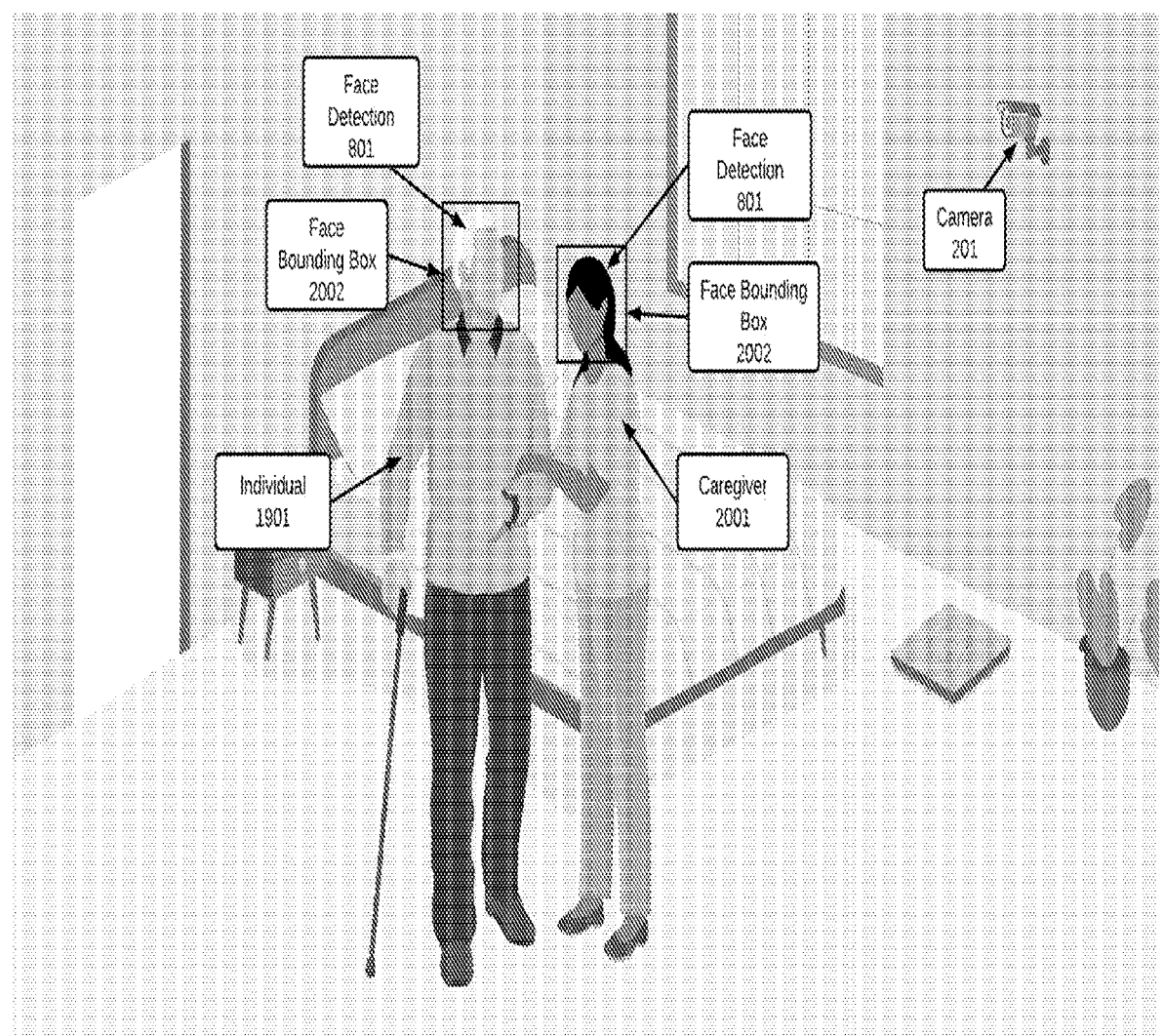
FIG. 20B represents facial detection of the individual and caregiver.
Figure 20C:
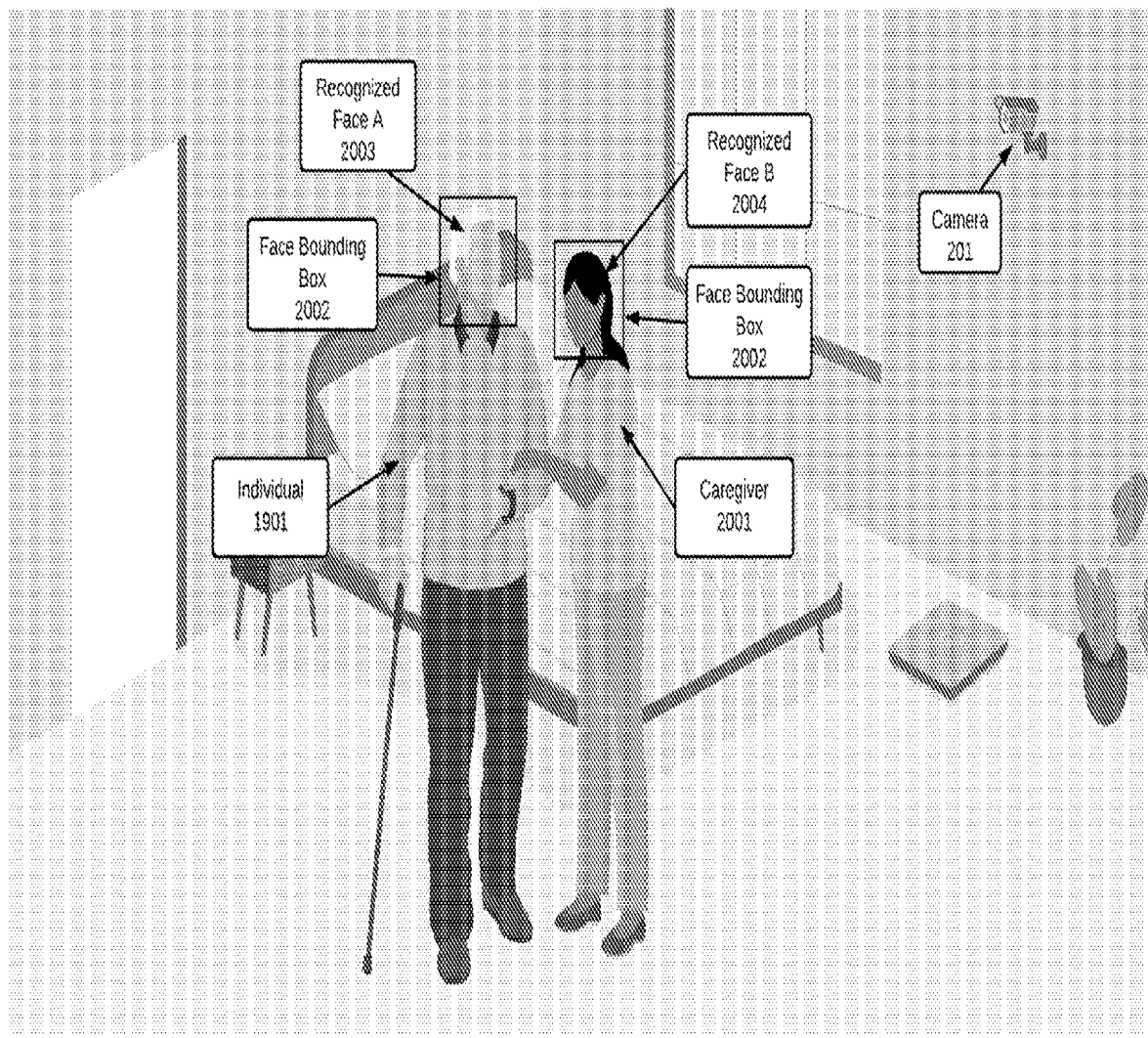
FIG. 20C represents the identification of both person's faces in an image using face recognition.

FIG. 20A represents an image of an individual 1901 being assisted by a caregiver 2001. FIG. 20B represents the detection of the faces of both individual and caregiver in an image. The system detects the faces from an image or video frame by using Face Detection 801. Face Detection 801 provides the location (i.e., bounding box coordinates) of all faces in an image or video frame. In the FIG. 20B, the faces of both persons are enclosed by a dashed Bounding Box 2002 which is formed using the Bounding Box Coordinates 402 generated by Face Detection 801. FIG. 20C represents the identification of both person's faces in an image using Face Recognition 710. The system performs Face Recognition 710 on detected faces to get the identity of the individuals in the image.

Figure 20D:
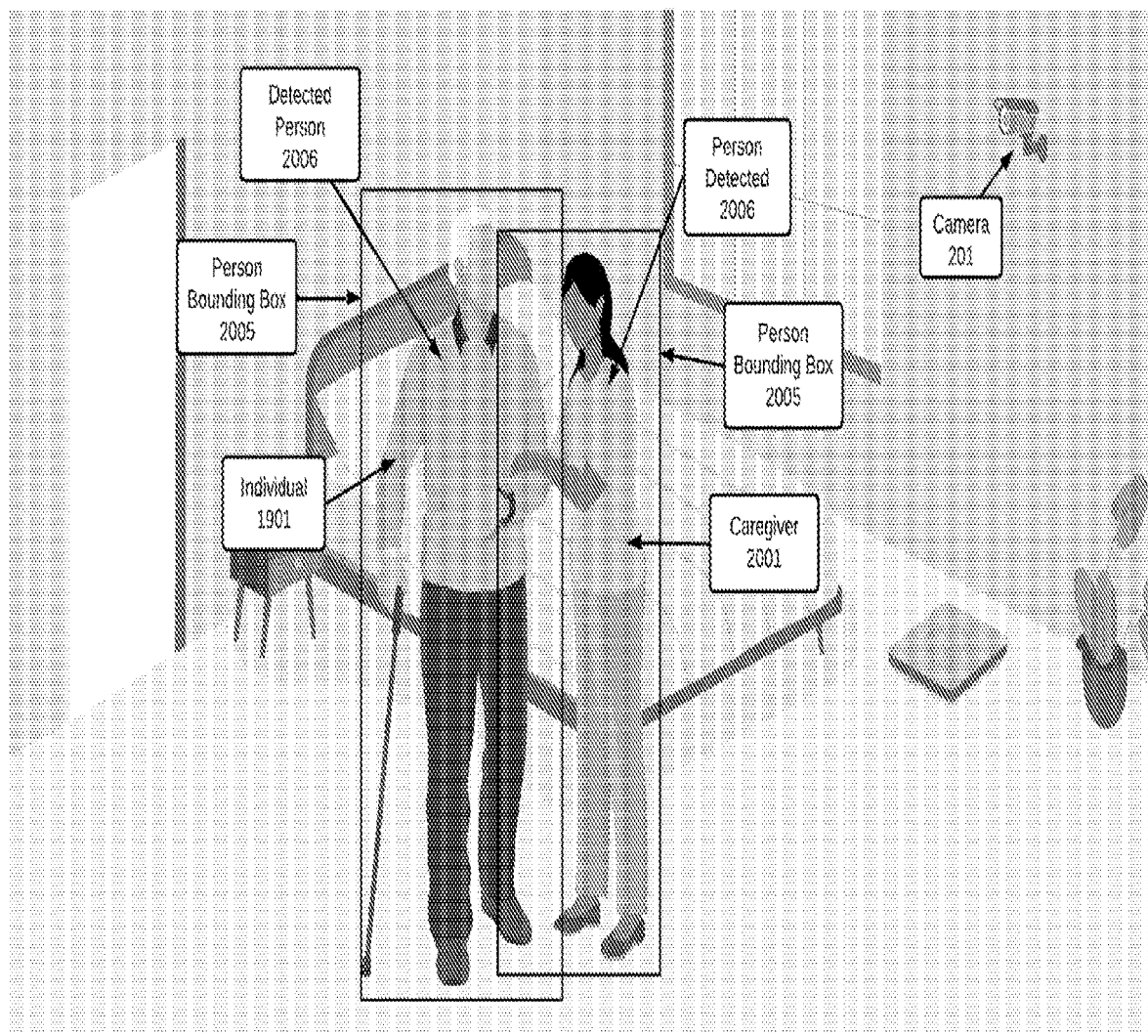
FIG. 20D represents detection of the bounding boxes of both persons in an image.
Figure 20E:
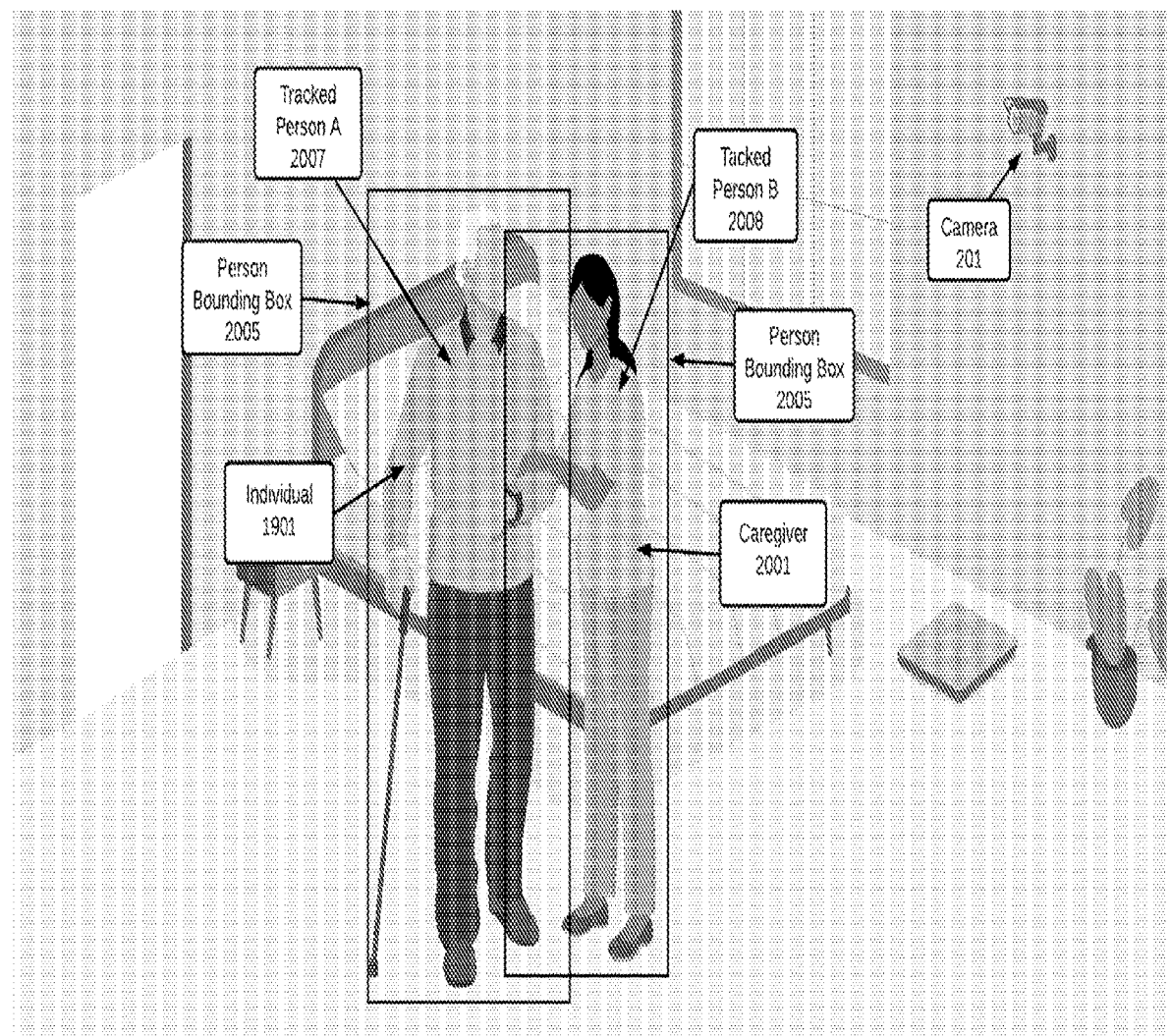
FIG. 20E represents tracking of the individuals.
Figure 20F:
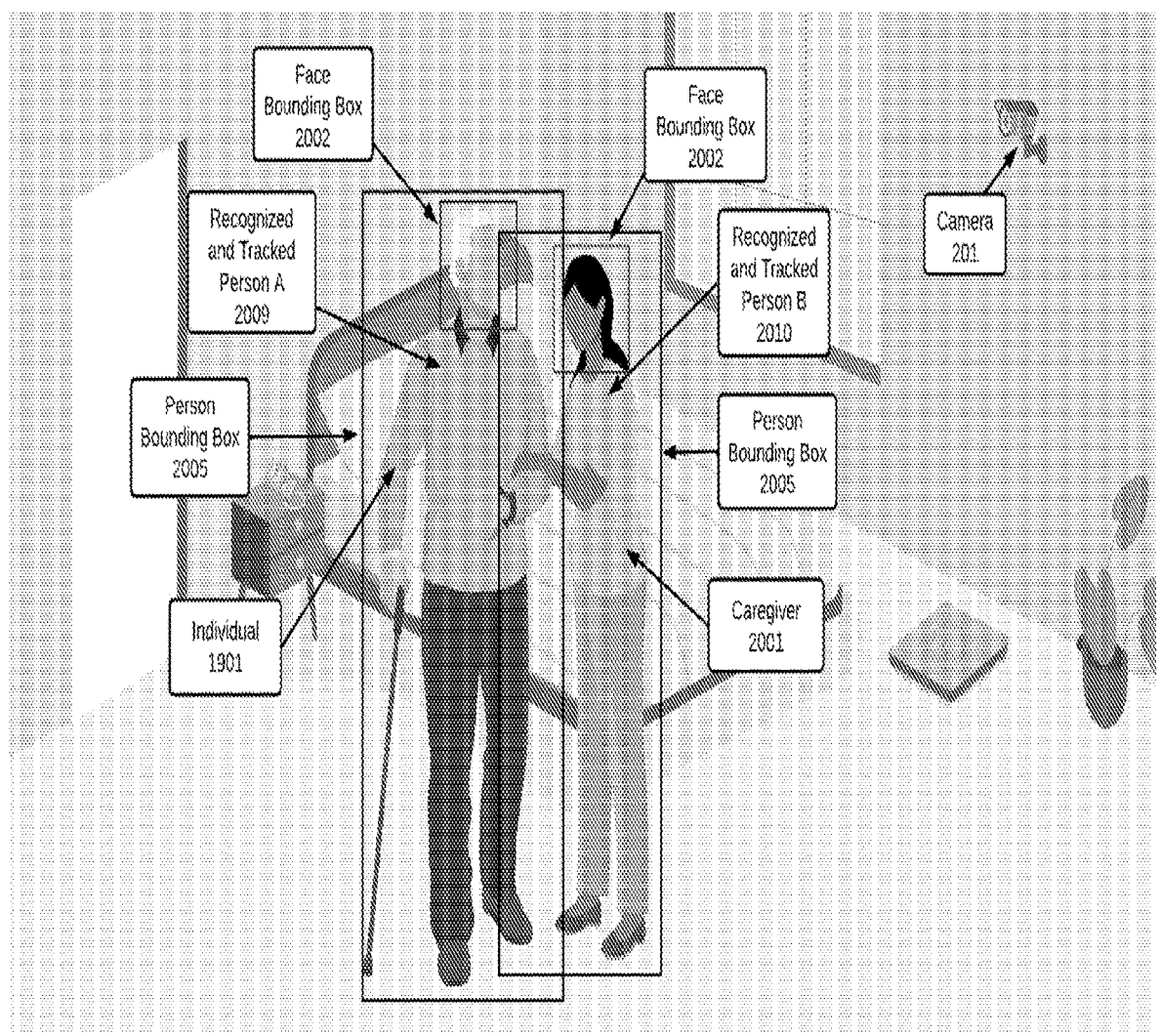
FIG. 20F represents recognition and tracking of the individuals.

FIG. 20D represents the detection of a Person Bounding Box 2003 of each Person 523 in an image. The system utilizes Object Detection 114 to get the location (i.e., Person Bounding Box 2003) of each Person 523 in the image. FIG. 20E represents the Tracking 119 of individuals in an image. The system uses Tracking 119 to track the resulting Person Bounding Boxes 2003 from Object Detection 114. FIG. 20F represents both the Face Recognition 710 and Tracking 119 of individuals in an image. The system assigns the results from Face Recognition 710 to each tracked Person Bounding Box 2003 so that it can understand which bounding box belongs to which person. As bounding boxes are tracked if an individual moves slightly in the image, the system can detect that the shifted bounding box belongs to the same individual.

Figure 21A:
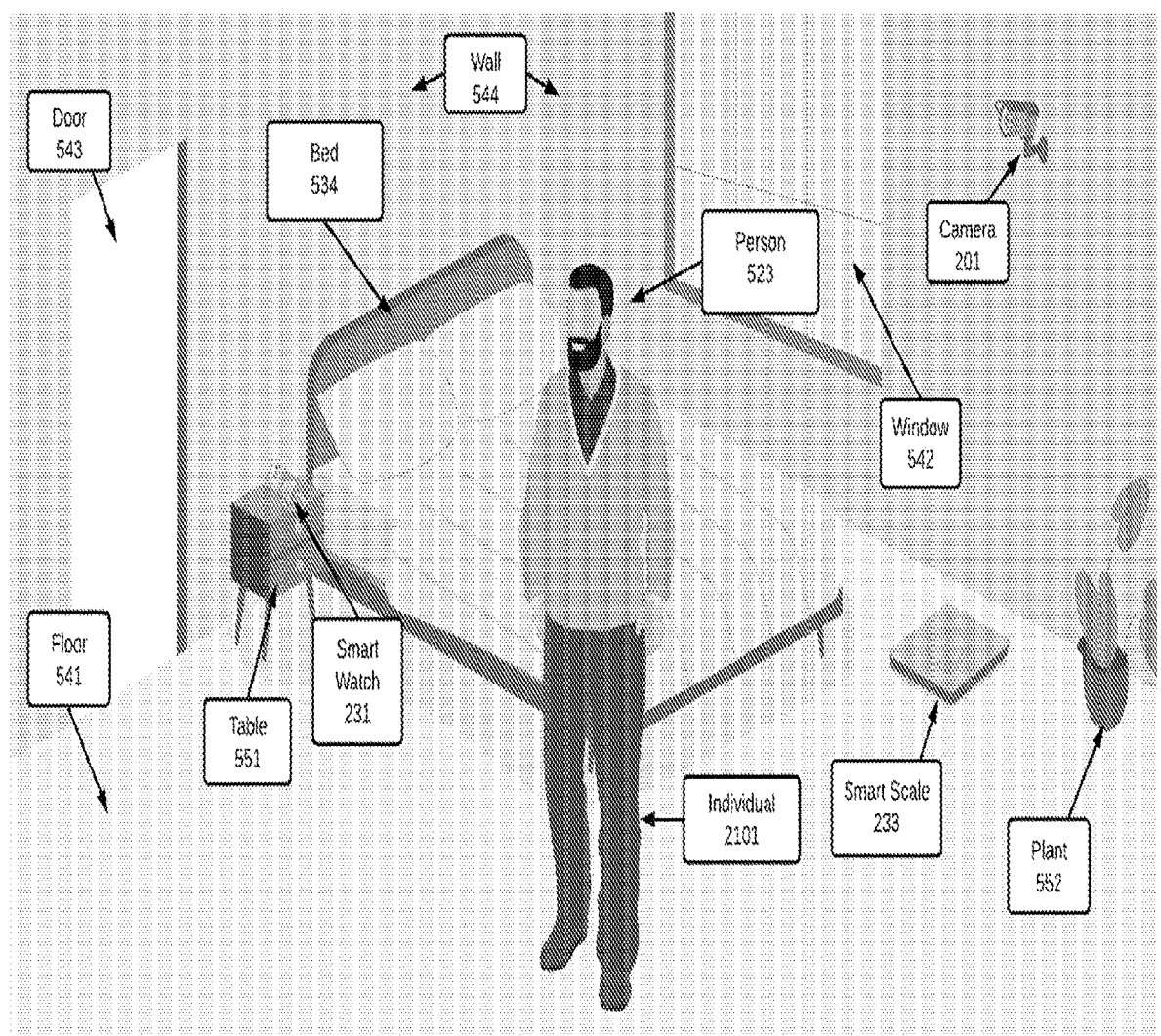
FIG. 21A represents an image of a single person in a room environment.

FIG. 21A represents an image of an Individual 1901 (Person 523) in a room environment that includes Floor 541, Window 542, Door 543, Wall 544 as well as furniture including Bed 534, Table 551 and Plant 552 and sensors including Camera 210, Smartwatch 231, and Smart Scale 232. This is the information the system gets from the camera sensor. At this stage, the only information the system has is the pixel colors.

Figure 21B:
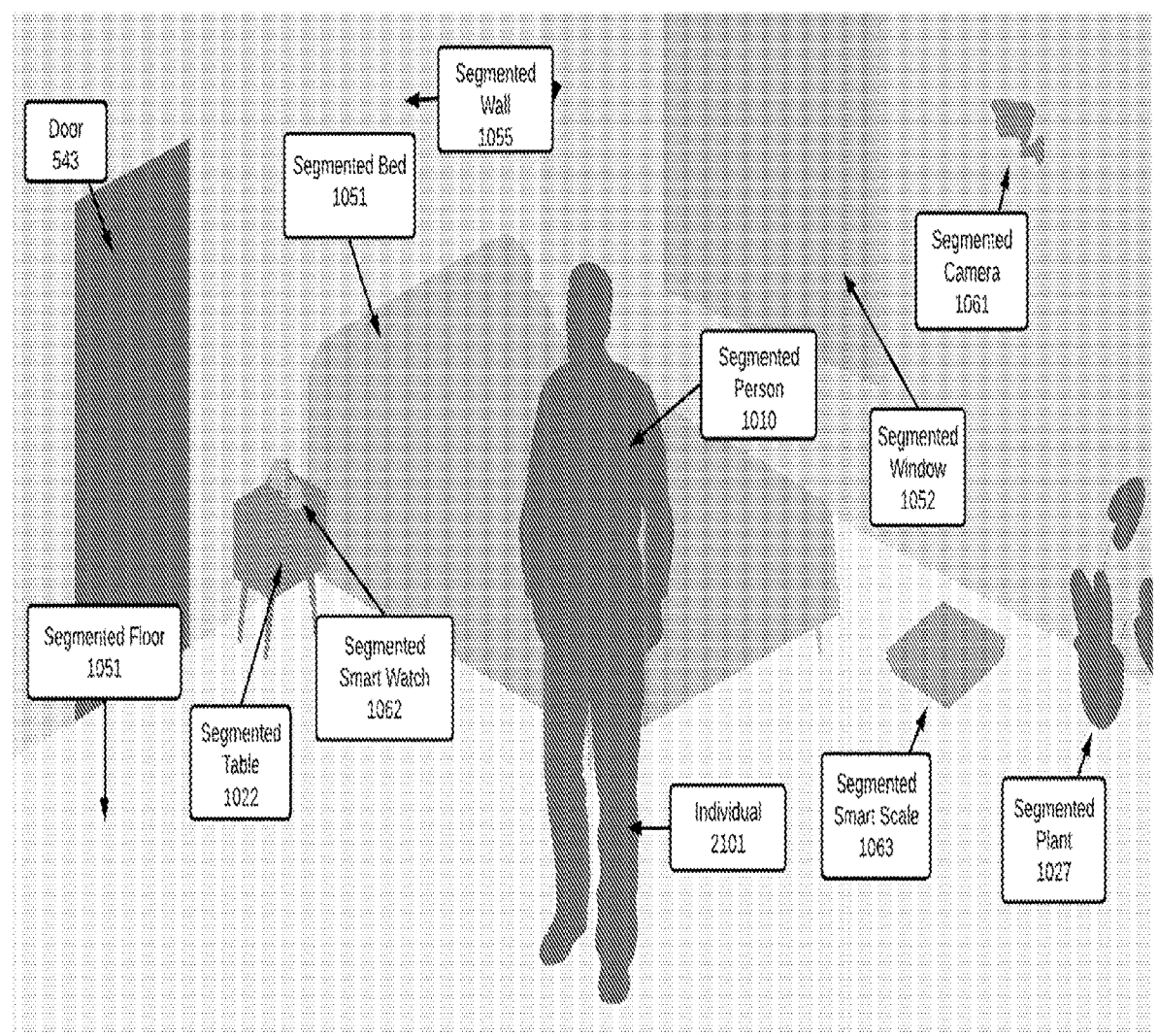
FIG. 21B represents the segmentation of each object in an image.

FIG. 21B represents the segmentation of each object in an image. The system applies the segmentation model to generate the segmentation mask of the image and from the mask it retrieves the segmented regions of each object (Detected Objects 401). Different objects are colored in different shades. The system gives a specific shade for the Person 523 (segmented as 1010), another shade for Segmented Table 1022, Bed 1026, Plant 1027, Floor 1051, Windows 1052, Door 1054, Walls 1055, Camera 1061, Smartwatch 1062, Smart Scale 1063, and so on. At this stage, the system generates new pixel level identification that can provide granular information about the environment. Pick any pixel or point in the environment and the system knows what kind of object the pixel or point belongs to.

Figure 21C:
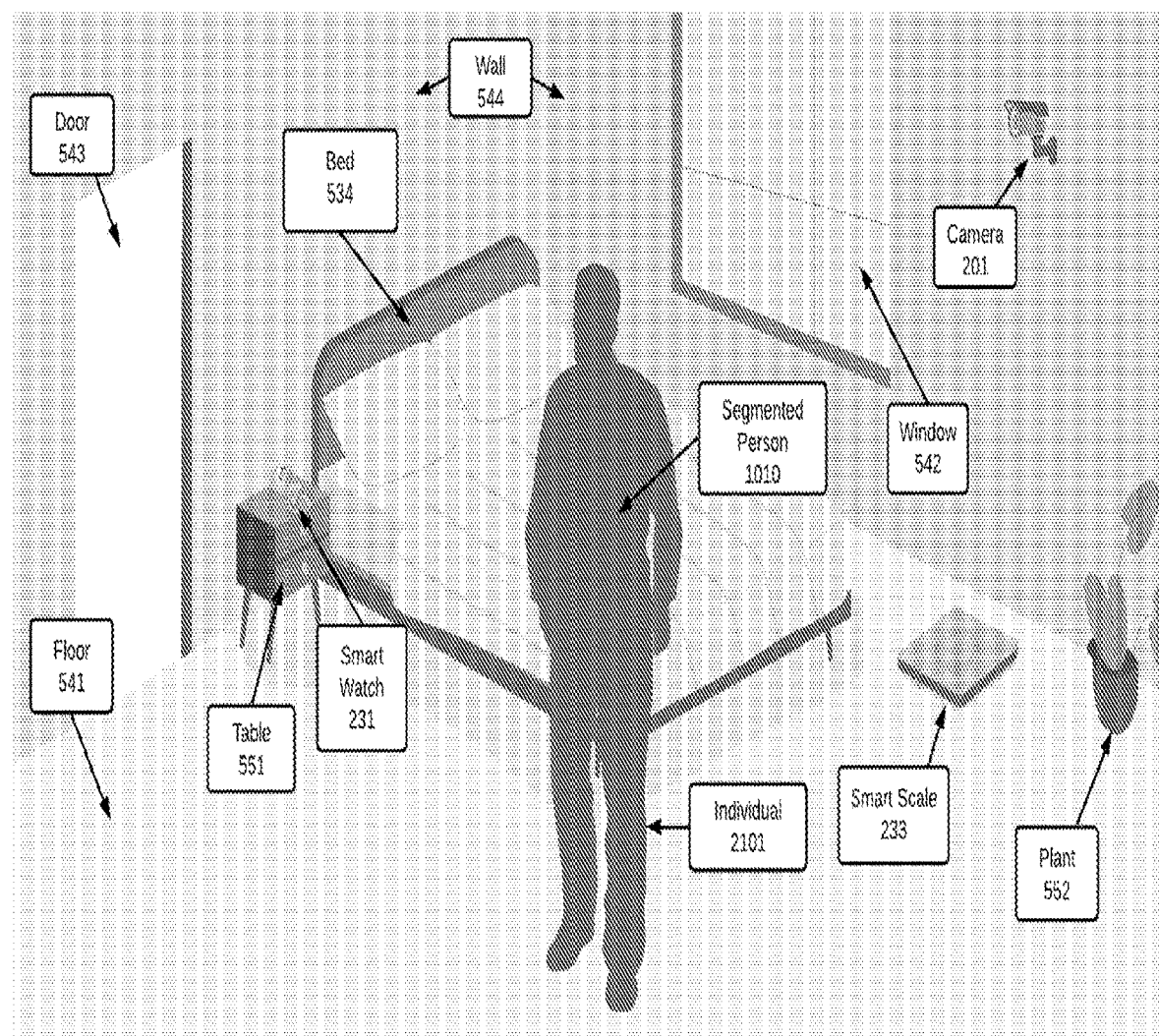
FIG. 21C represents an image of a scenario where only the individual's segmented area is being redacted and everything else is visible.

FIG. 21C represents an image of a scenario where only the Individual's 1901 Segmented Area 2101 is being redacted, but the Bed 534 and everything else described with respect to FIG. 21A is visible. The system identifies the individual first and then redacts the individual using the segmented mask if it is instructed to redact that particular individual. The granular level information allows the system to selectively modify the visualization of any object in the environment. For example, it can be chosen to redact the bed and not the individual very easily.

Figure 21D:
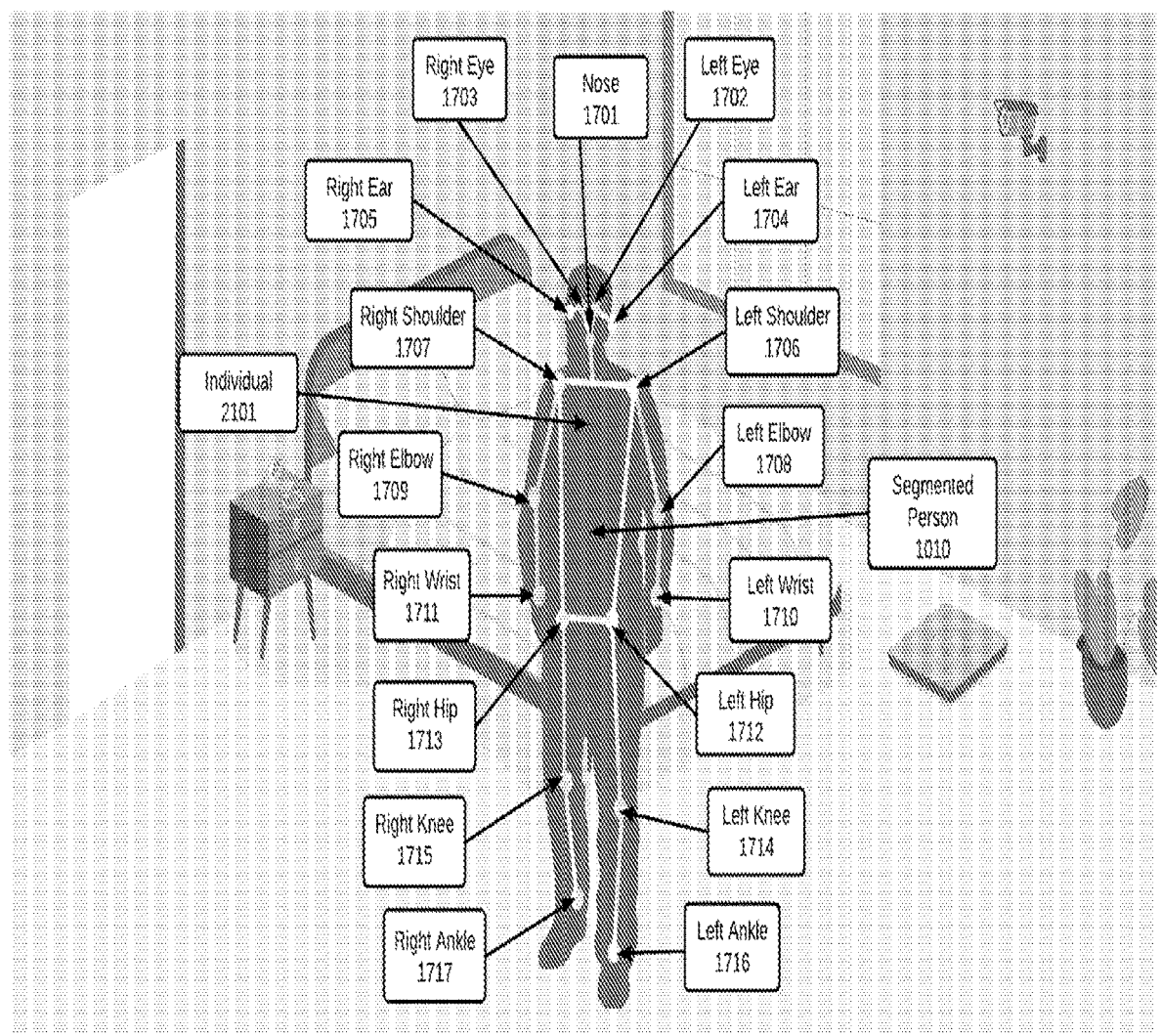
FIG. 21D represents an image where the skeletal pose is overlaid on the redacted individual.

FIG. 21D represents an image where the Skeletal Pose 315 is overlaid on the redacted individual. Skeletal Pose 315 is composed of Person Keypoints 1620, including Nose 1701, Left Eye 1702, Right Eye 1703, Left Ear 1704, Right Ear 1705, Left Shoulder 1706, Right Shoulder 1707, Left Elbow 1708, Right Elbow 1709, Left Wrist 1710, Right Wrist 1711, Left Hip 1712, Right Hip 1713, Left Knee 1714, Right Knee 1715, Left Ankle 1716, Right Ankle 1717. The system applies pose estimation to get the skeleton pose of the individual. This adds additional information to the visualization of the individual. First the appearance of an object was changed to preserve privacy or encrypt information, then additional information was overlaid onto it to add more context. With this, the system can hide or hold back any information and can add other forms of information, allowing it to be a robust and flexible monitoring system.

The principles can apply to the entity described thus far, as caregivers and any other groups of people. The embodiments of the invention, although described from the perspective of an individual under care, are in no way limited to that group and can be broadly applied to any situation where some form of monitoring is desired. Furthermore, although special care has been taken to redact PHI, the invention is in no way limited to it and can be applied in contexts where information redaction is not necessary such as warehouses, offices, and so on.

Additional Capabilities

In addition to the Machine Learning 110 tools and models described above, there are Additional Machine Learning 2201 fields that can be added to the system to provide augmented interactive and interpretive services. Reinforcement Learning 2202 provides a method to get an intelligent system that makes suggestions and decisions based on sensor data and improves over time through feedback of previous decisions. Natural Learning Processing 2203 analyzes text data to determine sentiment, to determine an automatic answer to a question, to classify the text, to recognize handwritten text, or to summarize a document in a smaller and/or more concise version. Generative Techniques 2204 are unsupervised machine learning methods that automatically learn data distribution and patterns in given input data and generate new data. This technique can be integrated with a bot or Speaker 1814 to make it intelligent where the bot can interact with humans like another human. Localization and Mapping 2205 allows robots to build a map for the environment of an Agent 2301 (discussed below) and localize the Agent 2301 within the map which makes navigation easier for robots. Machine Translation 2206 is another technique to translate speech or text data of one language into another language. With the help of Machine Translation 2206, two people who do not know each other's language can interact by translating each other's speech or text.

FIG. 23 shows the process of learning to make decisions by trial and error represented by Reinforcement Learning 2202. An Agent 2301, characterized as a physical or software entity, interacts with an Environment 2321 by taking Action 2311, causing the environment 2321 to transition to a New State 2341 from an Initial State 2351 and receiving Reward 2331. An environment 2321 is classified to be any space, physical or otherwise, which an Agent 2301 can interact with. Actions 2311 are things that an agent is allowed to perform in an environment 2321. Actions 2311 are accompanied by a signal that an Agent 2301 receives from an environment 2321 signifying how good that action is. States 2351 and 2341 are merely observations of an environment 2321 and represent all the information available to an Agent 2301 at that particular moment in time. An example of Reinforcement Learning 2202 can be a computer program playing a game of chess with a human player.

Figure 24:
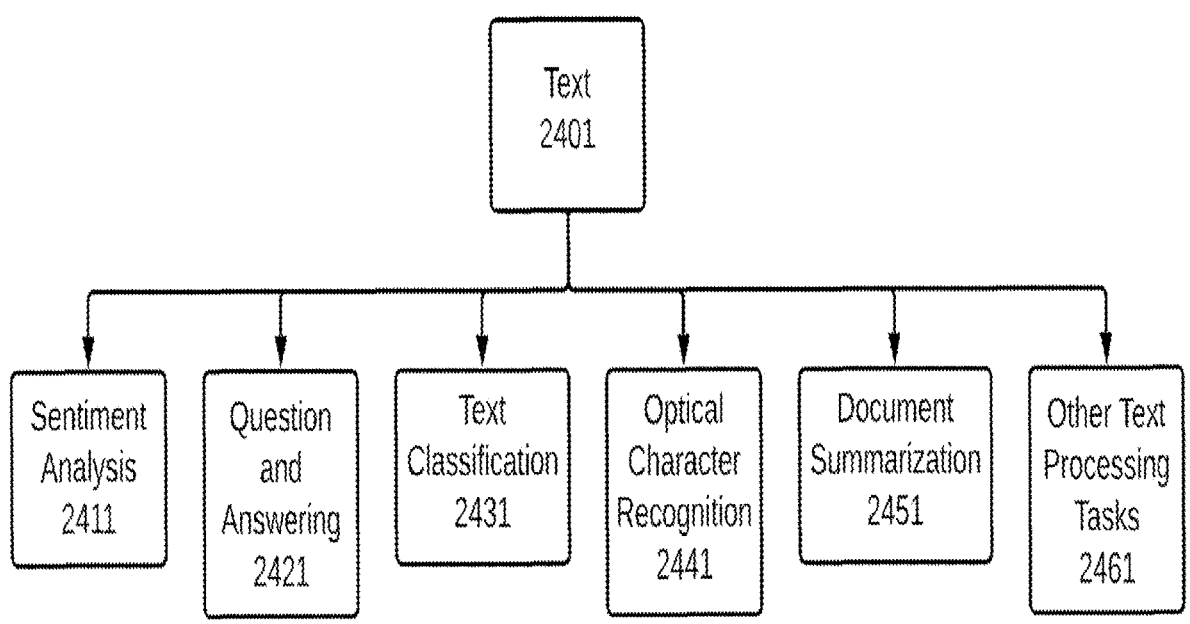
FIG. 24 illustrates the capabilities of natural language processing.

FIG. 24 illustrates the capabilities of Natural Language Processing 2203. Natural Language Processing (NLP) 2203 is a process of giving computer systems the ability to interpret and process language in Text 2401 format. Sentiment Analysis 2411 predicts the sentiment expressed in a piece of Text 2401. A sentiment may be negative, positive, or any other human emotion. Question and Answering 2421 attempts to answer questions posed by a human. Text Classification 2431 classifies text 2401 into predetermined labels. Optical Character Recognition (OCR) 2441 identifies characters in Text 2401 and can be useful to extract characters in documents and images. Together with Redaction 123, personally identifiable information can be protected as discussed above. Document Summarization 2451 summarizes Text 2401 in a concise or abbreviated version.

FIG. 25 gives a basic introduction to the Generative Techniques 2204. These techniques are unsupervised machine learning methods which automatically learn data distribution and patterns in given data so that it can generate new data. Generative Techniques 2204 focus on learning the true distribution of the given data so that newly generated data resembles the features of the given data approximately. Generative techniques 2204 can be applied to different modalities of data including Text 2401, Spatial Data 301, Audio Data 303 or other data 305 and generate new text 2511, audio 2521, spatial data 2531 or other types of data 2541. Conversational Bots 2551 can use Generative Techniques 2204 to respond to an input from a person. A conversational bot is an intelligent system which can respond human-like to speech and audio of a person. A conversational bot can be used in many cases. For example, it can generate images from given audio or speech. An individual can buy products or book hotel room, transportation via a bot.

Interaction with Large-Language Models (LLMs). At present, commercially available artificial intelligence LLMs understand images. As described above, embodiments of the present invention redact images of people. But with a focus on people, everything else in the background of the image gets missed. The system may be integrated with an LLM system, or may include an LLM module, that permits directing the redaction to remove other elements of the video/images that may include PHI or other sensitive information. As a first example, the LLM system or module may be instructed to "Redact the family picture that is sitting on top of the dresser that is behind the individual." As a first example, the LLM system or module may be instructed to "Redact the letters that spell a name that are displayed on the wall."

Figure 26:
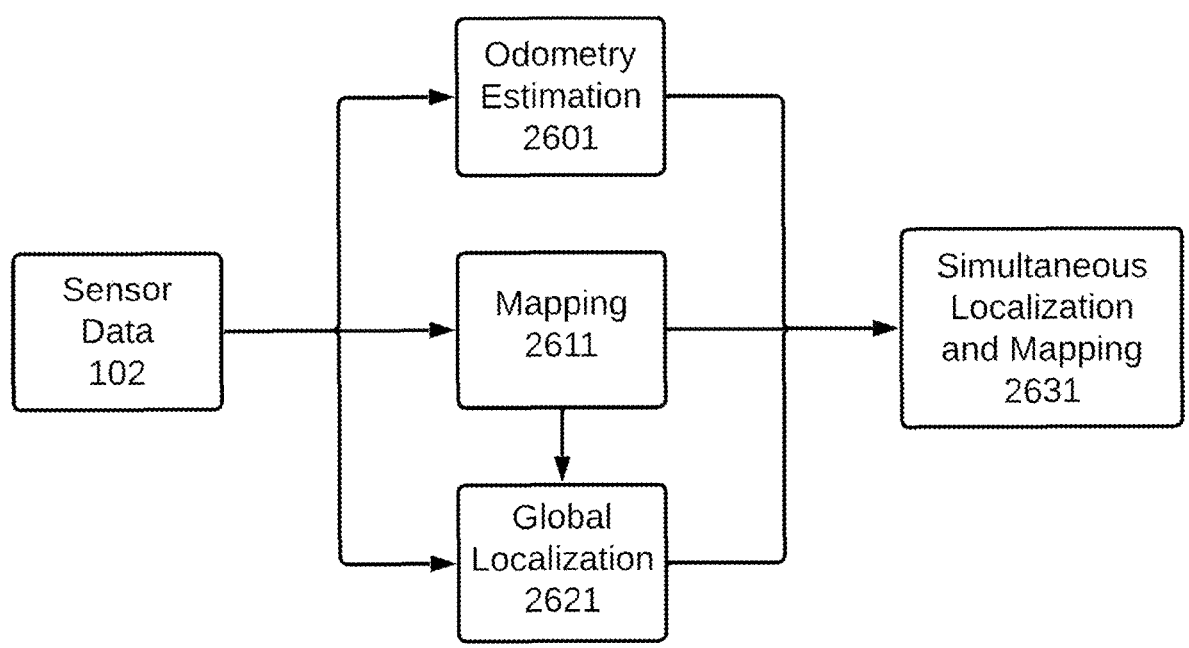
FIG. 26 illustrates the basic overview of simultaneous localization and mapping.

FIG. 26 illustrates the basic overview of Simultaneous Localization and Mapping ("SLAM") 2631. Localization and Mapping 2205 is the process of building a map for an environment and locating the agent 2401 within the map. SLAM integrates Odometry Estimation 2601, Global Localization 2621, Mapping 2611 processes and optimizes these processes to do Localization and Mapping 2205 simultaneously. Odometry Estimation 2601 is the process of calculating an estimate of motion change of an agent by comparing the observations of two or more sensor data observations. Mapping 2611 is concerned with building a map for the environment of the agent. Global Localization 2621 is the process of retrieving the global pose of agents in a known environment with prior knowledge.

Figure 27:
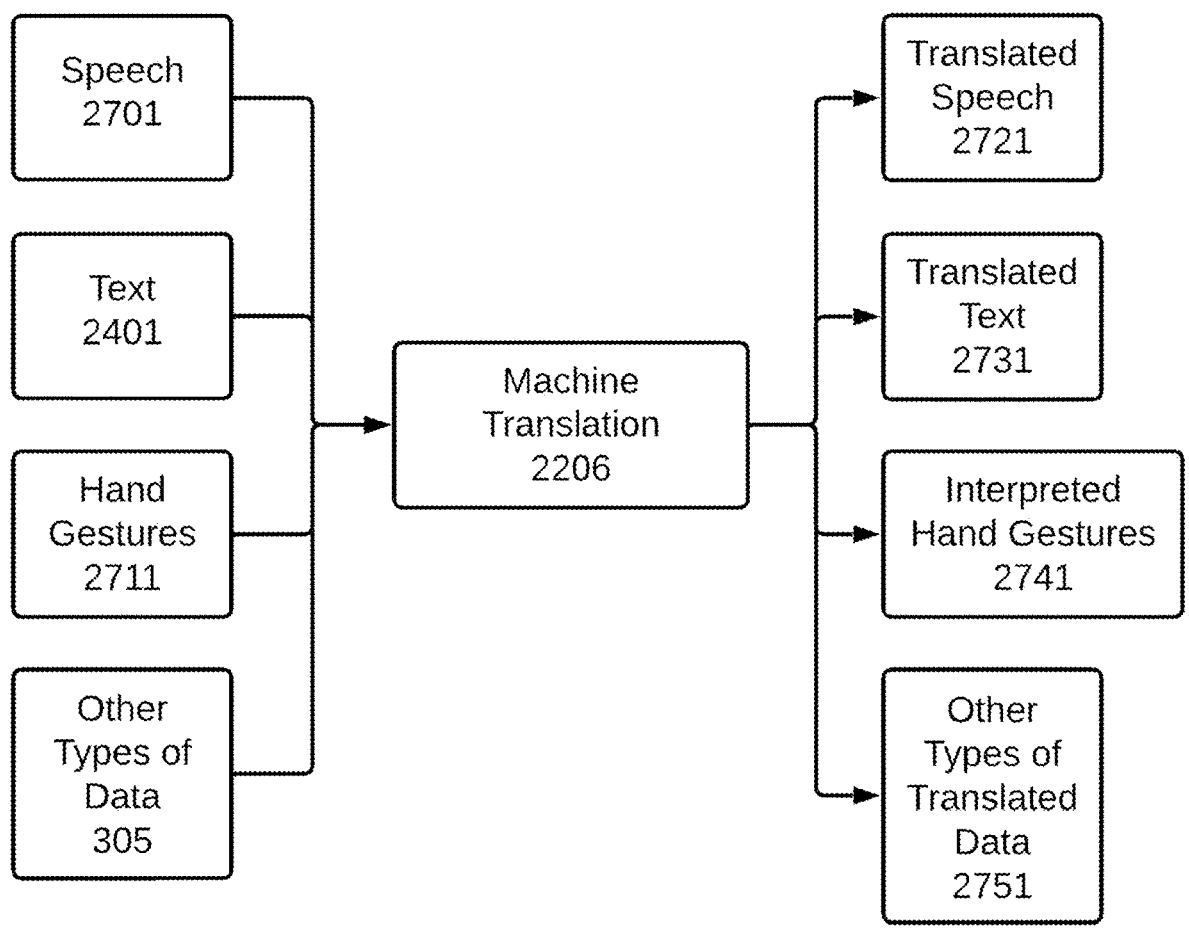
FIG. 27 depicts the tasks of converting text or speech of one language to another language using machine translation.
Figure 28:
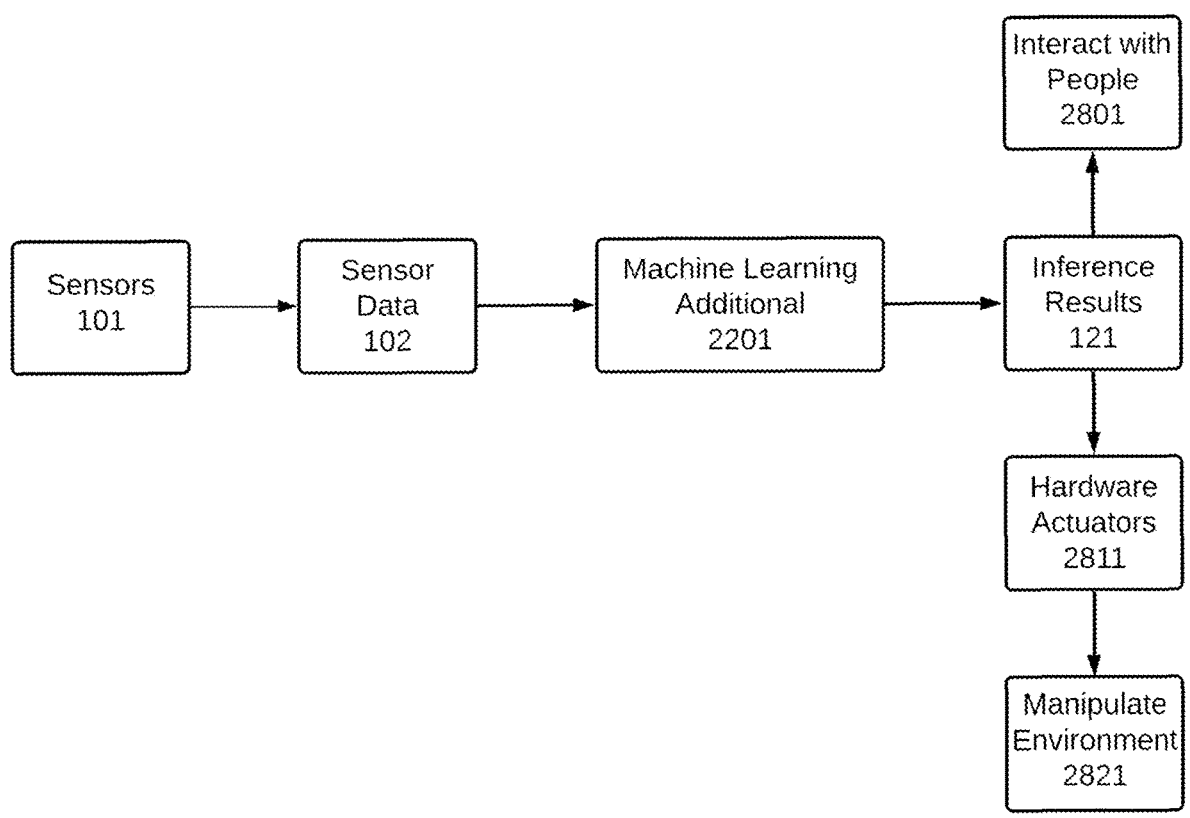
FIG. 28 shows the process of the system interacting with people and the environment.

FIG. 27 depicts the tasks of converting text or speech of one language to another language using Machine Translation 2206. A machine translation model takes the linguistics data that includes but is not limited to Speech data 2701, Text 2401, Hand Gestures 2711 in a specific language and translates it into translated speech 2721, translated text 2731, interpreted hand gestures 2741 and other translated data. Speech data 2701 can be voices or different sounds of a human being. Text data 2401 can be any written or typed document. By Hand Gestures 2711, an individual will be able to communicate with others by creating sign languages. Other types of data 305 can include body language (eye movement, face movement), brain wave signal and others. For example, there is an individual who knows only English. Now if there is another person who knows only French and the individual has to communicate with that person, then the individual will speak or write in English. Then the speech 2701 or text 2702 will be passed through the machine translation 2206 task to translate them in French.

Using a combination of sensors 101 and techniques described with respect to Machine Learning 110 and Machine Learning Additions 2201, the system can be made vastly more interactive, assistive, and useful. For instance, if a sensor 101 detects that a person is at a risk of tripping over something, then it can use Generated Audio 2521 and Speaker 1814 to warn the individual "Watch out! There's something in front of you". Not only that, if it suspects that a person is choking by interpreting hand gestures 2741, then it can use Question and Answering 2421 applied to audio data 303, to ask "Are you all right?" and if there is no answer, it can send an Alert 133. Crucially, by prompting a user for feedback, the system can leverage Reinforcement Learning 2202 and learn user preferences through trial and error. Every time the user affirms an action 2311 taken by the agent 2301, the system can use it as reward 2331 and tunes itself to make those decisions next time while decreasing the likelihood of making negatively asserted actions. This makes the system smarter over time and can be better than sending alerts 133 based on heuristics or inference results 121 alone.

Additionally, the system can be connected to hardware actuators 2811 to physically manipulate the environment 2821. For instance, lights can be turned on if a person gets up from bed at 2:00 AM and is walking towards the bathroom. A person in a wheelchair can be assisted by having the door open for them. Moreover, the system can embody a physical, assistive robot. Using Simultaneous Localization and Mapping 2631, a robot can create a map 2611 of the environment and navigate it through odometry estimation 2601 and global localization 2621. This can give the system mobility as opposed to being placed in a fixed location. Conversely, it can give an individual total privacy should they request it. Since the robot has physical hardware actuators 2811 it can act instead of merely suggest. So heavy objects can be carried by the robot as opposed to an elderly individual.

The system can incorporate Redaction 123 and encryption of the data so that the privacy of the individuals being monitored is preserved. This creates a person centric system. The system also Logs 132 the inference results and can Alert 133 the authorities involved in cases of emergencies. So, the system is monitoring the patients, interacting with them and involving the authorities at the same time to make sure the patients are cared for in an optimum way.

The steps do not need to be performed in the sequence shows. Certain processes can happen in parallel or position shifted to meet the system requirements. Additionally, apart from sensor data capture, all the information processing can happen either on-premises or in the cloud. Although disclosure above generally describes processing as being accomplished in software, the processing may be accomplished by hardware modules. For example, the end sensor may include the capability to accomplish the event recognition.

Attached to U.S. Provisional Patent Application No. 63/443,349 as an Appendix is further disclosure of embodiments and details of the invention, the disclosures and teachings of which are incorporated herein by reference in their entirety.

Embodiments of the invention include:

1. Inclusive of but not exclusive to HIPAA compliance.

2. Inclusive of but not exclusive to any environment where some form of monitoring or surveillance is desired.
3. Presents a comprehensive end-to-end system for the automatic capture of real-time streaming data, analysis, inference, redaction, alerting, and viewing with data access rights inclusive of but not exclusive to Caseloads as described in the U.S. Pat. No. 8,281,370.
4. Using fundamentally non-privacy-preserving data such as RGB images to create a privacy-enhanced, HIPAA compliant system through the use of redaction techniques that is customizable in complex ways based on user defined rules. Modalities such as RGB images and audio provide the most accurate ground truth data which also provides valuable contextual information that would otherwise be lost with different sensors.
5. Through the acquisition of different modalities of data such as biometric, visual, auditory, etc. it is possible to have a digital model of an individual, find interactions between stimuli and response and uncover new patterns of behavior.
6. Can be applied to a personal or communal setting with interactions between animate and inanimate objects.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

The invention claimed is:

1. An improvement to the way that computer systems operate to provide secure access of a user to electronic information of an individual under care, the improvement comprising a computer security method of recording information in an electronic format relating to the individual under care, from a sensor, identifying the individual under care from the information, and redacting information associated with the individual under care before transmitting to the user, comprising:
   storing historical data including attributes of the individual under care;
   recording electronic data via sensor, including data relating to the individual under care;
   transmitting at least a portion of said sensor data to a computer system with a memory and a processor;
   storing, by said computer system, at least a portion of said transmitted sensor data;
   comparing, by said computer system, the stored historical data of the individual under care to the stored sensor data;
   identifying said individual under care, by said computer system, using an artificial intelligence machine learning method, a portion of said stored sensor data pertaining to the individual under care by matching at least one attribute in the stored historical data of attributes of the individual under care with the attribute of the individual under care in the stored sensor data;
   redacting, by said computer system, said portion of said stored sensor data pertaining to the individual under care by removing information relating to the identity of the individual under care, wherein said redacting is done prior to any human access to said stored sensor data; and
   transmitting, by said computer system, said redacted portion of said stored sensor data pertaining to the individual under care, for access by said user.

2. A computer security method according to claim 1, wherein said sensor data includes video data.

3. A computer security method according to claim 2, wherein said attribute is one or more facial attributes.

4. A computer security method according to claim 3, wherein said facial attributes include facial landmark points.

5. A computer security method according to claim 2, further including the step of segmenting said video data to identify humans.

6. A computer security method according to claim 5, further including the step of generating a skeletal dataset from said segmented human video data.

7. A computer security method according to claim 6, further including the step of generating a skeletal pose sequence from said skeletal dataset.

8. A computer security method according to claim 6, wherein said generating a skeletal dataset further includes generating a one or more body key points from said skeletal dataset.

9. A computer security method according to claim 2, further including recognizing an action, using said artificial intelligence machine learning method, by matching at least one attribute in the stored historical data of attributes of the individual under care with the attribute of the individual under care in the stored video data.

10. A computer security method according to claim 9, wherein said matched attribute is a skeletal pose.

11. A computer security method according to claim 1, wherein said sensor data includes biometric data.

12. A computer security method according to claim 1, wherein said sensor data includes personal health information.

13. A computer security method according to claim 12, wherein said access by the user is HIPAA-compliant.

14. An improvement to the way that computer systems operate to provide secure access of a user to electronic information of an individual under care, the improvement comprising a computer security system configured to record information in an electronic format relating to the individual under care, from a sensor, identifying the individual under care from the information, and redacting information associated with the individual under care before transmitting to the user, comprising:
   at least one sensor for recording electronic data, including data relating to the individual under care;
   a computer system with a memory and a processor configured to:
     store historical data including attributes of the individual under care;
     transmit at least a portion of said sensor data to a computer system with a memory and a processor;
     store at least a portion of said transmitted sensor data;
     compare the stored historical data of the individual under care to the stored sensor data;
     identify said individual under care, using an artificial intelligence machine learning method, a portion of said stored sensor data pertaining to the individual under care by matching at least one attribute in the stored historical data of attributes of the individual under care with the attribute of the individual under care in the stored sensor data;
     redact said portion of said stored sensor data pertaining to the individual under care by removing information relating to the identity of the individual under care, wherein said redacting is done prior to any human access to said stored sensor data; and transmit said redacted portion of said stored sensor data pertaining to the individual under care, for access by said user.

15. A computer security system according to claim 14, wherein said sensor data includes video data.

16. A computer security method according to claim 15, wherein said attribute is one or more facial attributes.

17. A computer security method according to claim 16, wherein said facial attributes include facial landmark points.

18. A computer security method according to claim 15, further including the step of segmenting said video data to identify humans.

19. A computer security method according to claim 18, further including the step of generating a skeletal dataset from said segmented human video data.

20. A computer security method according to claim 19, further including the step of generating a skeletal pose sequence from said skeletal dataset.

21. A computer security method according to claim 19, wherein said generating a skeletal dataset further includes generating a one or more body key points from said skeletal dataset.

22. A computer security method according to claim 15, further including recognizing an action, using said artificial intelligence machine learning method, by matching at least one attribute in the stored historical data of attributes of the individual under care with the attribute of the individual under care in the stored video data.

23. A computer security method according to claim 22, wherein said matched attribute is a skeletal pose.

24. A computer security method according to claim 14, wherein said sensor data includes biometric data.

25. A computer security method according to claim 14, wherein said sensor data includes personal health information.

26. A computer security method according to claim 25, wherein said access by the user is HIPAA-compliant.

* * * * *

UNITED STATES PATENT AND TRADEMARK OFFICE
CERTIFICATE OF CORRECTION

PATENT NO. : 12,462,909 B2  
APPLICATION NO. : 18/430784  
DATED : November 4, 2025  
INVENTOR(S) : Turock et al.

Page 1 of 1

It is certified that error appears in the above-identified patent and that said Letters Patent is hereby corrected as shown below:

On the Title Page

Item (72), the listing of inventors, should be corrected as shown below:
-- David Lawrence Turock, Fort Lauderdale, FL (US); Justin Mark Brockie, Wolcott, CT (US); James Michael Kelly, Morris, CT (US); Richard Allen Robbins, Lenox, MA (US); Md Rayed Bin Wahed, Dhaka (BD); Rafid Ameer Mahmud, Dhaka (BD); Meheraj Hossain, Dhaka (BD); Pranjal Kumar Nandi, Dhaka (BD); Heather Anne Turock, Fort Lauderdale, FL (US); Md. Asif Ali, Rocky Hill, CT (US); Jeremy Ian Schulman Robbins, New York, NY (US) --

Signed and Sealed this  
Ninth Day of December, 2025

John A. Squires  
*Director of the United States Patent and Trademark Office*